US012547102B2

(12) United States Patent
Sakamaki

(10) Patent No.: US 12,547,102 B2
(45) Date of Patent: Feb. 10, 2026

(54) DEVELOPING APPARATUS

(71) Applicant: CANON KABUSHIKI KAISHA, Tokyo (JP)

(72) Inventor: Tomoyuki Sakamaki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/817,616

(22) Filed: Aug. 28, 2024

(65) Prior Publication Data

US 2025/0093794 A1 Mar. 20, 2025

(30) Foreign Application Priority Data

Sep. 15, 2023 (JP) ................................ 2023-150218

(51) Int. Cl.
*G03G 15/09* (2006.01)
*G03G 15/01* (2006.01)

(52) U.S. Cl.
CPC ..... *G03G 15/0921* (2013.01); *G03G 15/0121* (2013.01); *G03G 15/0189* (2013.01); *G03G 2215/0648* (2013.01)

(58) Field of Classification Search
CPC ........... G03G 15/0921; G03G 15/0928; G03G 15/0935; G03G 2215/0648
See application file for complete search history.

(56) References Cited

U.S. PATENT DOCUMENTS 7,610,002 B2 * 10/2009 Kabashima ........ G03G 15/0928 399/269
2004/0022560 A1 * 2/2004 Hirobe ............... G03G 15/0893 399/269
2006/0008300 A1 1/2006 Tanaka
2007/0053724 A1 3/2007 Akashi et al.
(Continued)

FOREIGN PATENT DOCUMENTS

JP H103218 A 1/1998
JP 2010091941 A 4/2010
(Continued)

OTHER PUBLICATIONS

Extended European search report issued in European Appln. No. 24198015.0 mailed on Jan. 31, 2025.

*Primary Examiner* — Carla J Therrien
(74) *Attorney, Agent, or Firm* — ROSSI, KIMMS & McDOWELL LLP

(57) ABSTRACT

A first maximum position where a magnetic flux density of a first magnetic pole is maximum is positioned downstream of a first developing position and upstream of a first closest position. A second maximum position where a magnetic flux density of a third magnetic pole is maximum is positioned downstream of a second closest position and upstream of a second developing position. A relationship of $r1 \times \theta 1 > r2 \times \theta 2$ is satisfied, in a case where r1 represents a radius of a first rotatable developing member, r2 represents a radius of a second rotatable developing member, θ1 represents an angle from the first maximum position to the first closest position
(Continued)

in the rotational direction of the first rotatable developing member, and θ2 represents an angle from the second closest position to the second maximum position in the rotational direction of the second rotatable developing member.

19 Claims, 15 Drawing Sheets

(56) References Cited

U.S. PATENT DOCUMENTS

| | | | | |
|---|---|---|---|---|
| 2007/0053725 | A1* | 3/2007 | Sakamaki | G03G 15/0921 399/269 |
| 2011/0229214 | A1* | 9/2011 | Oba | G03G 15/0935 399/269 |
| 2013/0330107 | A1 | 12/2013 | Itagaki et al. | |
| 2014/0016969 | A1 | 1/2014 | Yoshii | |
| 2015/0268586 | A1* | 9/2015 | Sakamaki | G03G 15/0921 399/269 |
| 2017/0269509 | A1* | 9/2017 | Shimizu | G03G 15/0812 |

FOREIGN PATENT DOCUMENTS

| | | | |
|---|---|---|---|
| JP | 2013254107 | A | 12/2013 |
| JP | 2016009174 | A | 1/2016 |

* cited by examiner

DEVELOPING APPARATUS

BACKGROUND OF THE INVENTION

Field of the Invention

The present invention relates to a developing apparatus that develops an electrostatic latent image formed on an image bearing member with a developer.

Description of the Related Art

As a developing apparatus, a configuration in which two developing rollers for developing an electrostatic latent image formed on an image bearing member with a developer are arranged side by side in a rotational direction of the image bearing member has been proposed (US2013/0330107). In the developing apparatus described in US2013/0330107, the developer is supplied from a supply unit to a first developing roller (first rotatable developing member) positioned lower in a vertical direction among the two developing rollers, and the developer is delivered from the first developing roller positioned lower to a second developing roller (second rotatable developing member) positioned higher in the vertical direction.

As described in US2013/0330107, in the configuration in which the developer is delivered from the first developing roller to the second developing roller positioned higher in the vertical direction, the delivery of the developer from the first developing roller to the second developing roller is performed against gravity. Here, a composite magnetic force generated by magnets built in the first developing roller and the second developing roller, and the gravity act on a magnetic carrier included in the developer on the first developing roller. Therefore, a force obtained by adding the gravity to the composite magnetic force is required to be directed in a direction away from the first developing roller (a direction toward the second developing roller) in order to deliver the developer from the first developing roller to the second developing roller.

In this regard, if a magnetic flux density of a receiving pole, which is a magnetic pole that receives the developer from the first developing roller, of the magnet in the second developing roller is increased to some extent, the magnetic force can be directed in the direction toward the second developing roller even when an influence of the gravity is taken into consideration. However, when the magnetic flux density of the receiving pole of the magnet in the second developing roller is excessively increased, the developer delivered to the second developing roller tends to stay in the vicinity of the receiving pole, as a result of which a shearing force acts on the developer, which may cause deterioration of the developer, generation of clusters of agglomerates, and the like. As a result, an image defect may occur.

The present invention improves transferability of a developer from a first rotatable developing member to a second rotatable developing member while suppressing deterioration of the developer delivered from the first rotatable developing member to the second rotatable developing member.

SUMMARY OF THE INVENTION

According to one aspect of the present invention, a developing apparatus includes a first rotatable developing member to which a developer including a toner and a carrier is supplied, the first rotatable developing member being configured to carry and feed the developer to a first developing position, a first magnet provided non-rotatably and stationarily inside the first rotatable developing member, the first magnet having a first magnetic pole and a second magnetic pole provided downstream of the first magnetic pole and adjacent to the first magnetic pole in a rotational direction of the first rotatable developing member and having the same magnetic polarity as that of the first magnetic pole, a second rotatable developing member disposed to face the first rotatable developing member and configured to receive the developer delivered from the first rotatable developing member by a magnetic field generated by the first magnet, the second rotatable developing member being configured to carry and feed the developer to a second developing position, the second rotatable developing member having a rotation axis positioned higher than a rotation axis of the first rotatable developing member in a vertical direction, the rotational direction of the first rotatable developing member at a first closest position where the first rotatable developing member is closest to the second rotatable developing member on an outer surface of the first rotatable developing member being opposite to a rotational direction of the second rotatable developing member at a second closest position where the second rotatable developing member is closest to the first rotatable developing member on an outer surface of the second rotatable developing member, and, a second magnet provided non-rotatably and stationarily inside the second rotatable developing member, the second magnet having a third magnetic pole disposed to face the first magnetic pole and having a different magnetic polarity from that of the first magnetic pole. A first maximum position where a magnetic flux density of the first magnetic pole in a normal direction relative to an outer peripheral surface of the first rotatable developing member is maximum is positioned downstream of the first developing position and upstream of the first closest position in the rotational direction of the first rotatable developing member. A second maximum position where a magnetic flux density of the third magnetic pole in a normal direction relative to an outer peripheral surface of the second rotatable developing member is maximum is positioned downstream of the second closest position and upstream of the second developing position in the rotational direction of the second rotatable developing member. A relationship of $r1\times\theta1>r2\times\theta2$ is satisfied, in a case where r1 represents a radius of the first rotatable developing member, r2 represents a radius of the second rotatable developing member, θ1 represents an angle from the first maximum position to the first closest position in the rotational direction of the first rotatable developing member, and θ2 represents an angle from the second closest position to the second maximum position in the rotational direction of the second rotatable developing member.

Further features of the present invention will become apparent from the following description of exemplary embodiments with reference to the attached drawings.

DESCRIPTION OF THE EMBODIMENTS

An embodiment will be described with reference to FIGS. 1 to 14. First, a schematic configuration of an image forming apparatus of the present embodiment will be described with reference to FIG. 1.

Image Forming Apparatus

Figure 1:
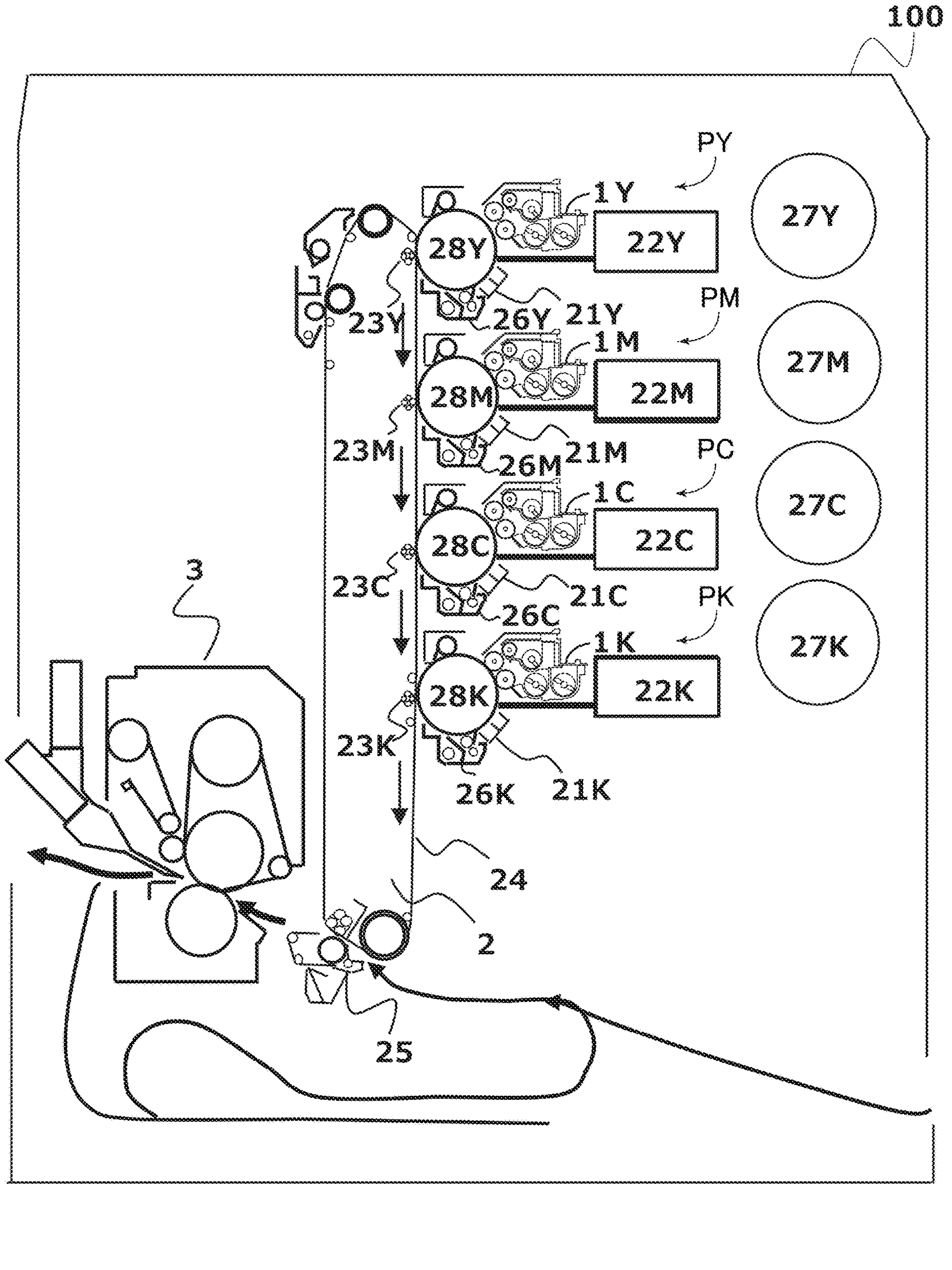
FIG. 1 is a schematic cross-sectional view illustrating a configuration of an image forming apparatus according to an embodiment.

An image forming apparatus 100 is a full-color image forming apparatus, and in the present embodiment, for example, is a multi-function peripheral (MFP) having a copy function, a printer function, and a scan function. As illustrated in FIG. 1, the image forming apparatus 100 includes image forming units PY, PM, PC, and PK that perform image forming processes for toner images of four colors of yellow, magenta, cyan, and black, respectively, in parallel.

The image forming units PY, PM, PC, and PK of the respective colors include primary chargers 21Y, 21M, 21C, and 21K, developing apparatuses 1Y, 1M, 1C, and 1K, optical writing units (exposure devices) 22Y, 22M, 22C, and 22K, photosensitive drums 28Y, 28M, 28C, and 28K, and cleaning devices 26Y, 26M, 26C, and 26K. The image forming apparatus 100 includes a transfer device 2 and a fixing device 3. Since configurations of the image forming units PY, PM, PC, and PK of the respective colors are similar to each other, the image forming unit PY will be described below as a representative.

The photosensitive drum 28Y serving as an image bearing member is a photosensitive member including a photosensitive layer made of a resin such as a polycarbonate resin containing an organic photo conductor (OPC), and is configured to rotate at a predetermined speed. The primary charger 21Y includes a corona discharge electrode disposed around the photosensitive drum 28Y, and charges the surface of the photosensitive drum 28Y with generated ions.

The optical writing unit 22Y incorporates a scanning optical device, and exposes the charged photosensitive drum 28Y based on image data to lower a potential of an exposed portion, thereby forming a charge pattern (electrostatic latent image) corresponding to the image data. The developing apparatus 1Y transfers a contained developer to the photosensitive drum 28Y to develop the electrostatic latent image formed on the photosensitive drum 28Y. The developer is formed by mixing a carrier and a toner corresponding to each color, and the electrostatic latent image is visualized by the toner.

The transfer device 2 includes primary transfer rollers 23Y, 23M, 23C, and 23K, an intermediate transfer belt 24, and a secondary transfer roller 25. The intermediate transfer belt 24 is wound around the primary transfer rollers 23Y, 23M, 23C, and 23K and a plurality of rollers, and is supported so as to be able to travel. The primary transfer rollers 23Y, 23M, 23C, and 23K correspond to respective colors of yellow (Y), magenta (M), cyan (C), and black (K) in order from the top in FIG. 1. The secondary transfer roller 25 is disposed outside the intermediate transfer belt 24, and is configured to allow a recording material to pass between the secondary transfer roller 25 and the intermediate transfer belt 24. Note that the recording material is, for example, a sheet such as a paper sheet or a plastic sheet.

The toner images of the respective colors formed on the photosensitive drums 28Y, 28M, 28C, and 28K are sequentially transferred onto the intermediate transfer belt 24 by the primary transfer rollers 23Y, 23M, 23C, and 23K, so that a toner image in which the respective colors of yellow, magenta, cyan, and black are layered in a superimposed manner is formed. The formed toner image is transferred to the recording material conveyed from a cassette or the like storing the recording material by the secondary transfer roller 25. Pressure and heat are applied to the recording material to which the toner image is transferred in the fixing device 3. As a result, the toner on the recording material is melted, and the color image is fixed to the recording material.

Developer storages 27Y, 27M, 27C, and 27K are provided corresponding to the developing apparatuses 1Y, 1M, 1C, and 1K, respectively, and bottles accommodating developers corresponding to the respective colors of yellow, magenta, cyan, and black are replaceably loaded in order from the top. The developer storages 27Y, 27M, 27C, and 27K are configured to be able to feed (replenish) the developers to the developing apparatuses 1Y, 1M, 1C, and 1K corresponding to the colors of the accommodated developers.

For example, a weight ratio of the toner of the developer contained in the bottle is 80 to 95%, and a weight ratio of the toner of the developer in each of the developing apparatuses 1Y, 1M, 1C, and 1K is 5 to 10%. Therefore, once the toner is consumed to perform the development in the developing apparatuses 1Y, 1M, 1C, and 1K, the developer containing the toner is replenished by the amount of consumption, and the weight ratio of the toner of the developer in each of the developing apparatuses 1Y, 1M, 1C, and 1K is maintained constant.

Developing Apparatus

Next, the developing apparatuses 1Y, 1M, 1C, and 1K will be described in detail with reference to FIGS. 2 to 5. Since the configurations of the developing apparatuses 1Y, 1M, 1C, and 1K are the same as each other, the developing apparatus 1Y will be described below as a representative.

Figure 2:
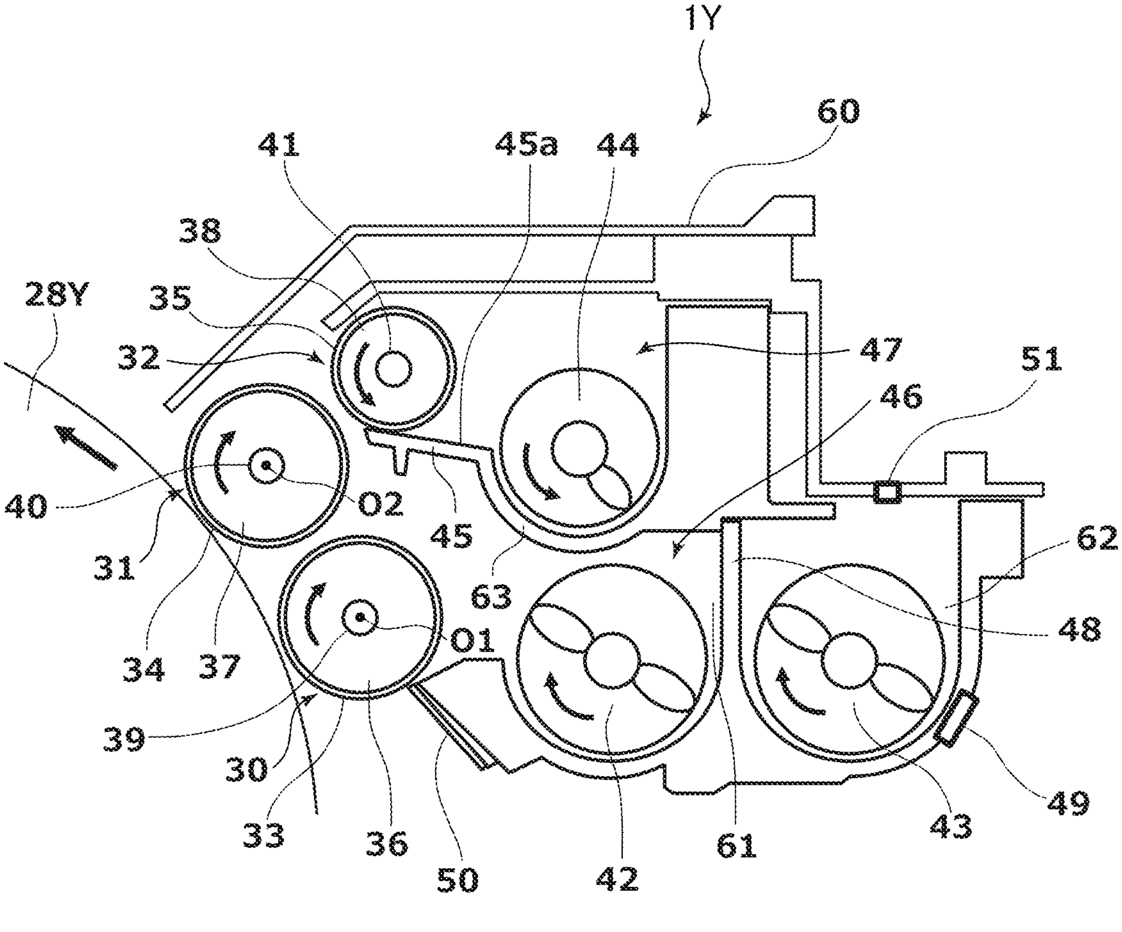
FIG. 2 is a schematic cross-sectional view illustrating a configuration of a developing apparatus according to the embodiment.

FIG. 2 is a conceptual view illustrating the developing apparatus 1Y illustrated in FIG. 1, and FIGS. 3, 4, and 5 are conceptual views illustrating magnetic pole configurations of a first magnet 36, a second magnet 37, and a third magnet 38 disposed in the developing apparatus 1Y.

As illustrated in FIG. 2, the developing apparatus 1Y includes a first developing roller 30, a second developing roller 31, a peeling roller 32, a developer supplying screw 42, a developer stirring screw 43, and a developer collecting screw 44, and these members are housed in a developing container 60.

The first developing roller 30 is a developer carrying member that is rotationally driven, and is disposed at a position adjacent to the photosensitive drum 28Y such that a rotation axis thereof is substantially parallel to a rotation axis of the photosensitive drum 28Y. The first developing roller 30 includes a first sleeve (first rotatable developing member) 33 that rotates and the first magnet (fixed magnet) 36 that is provided non-rotatably inside the first sleeve 33 and attracts the developer to the surface of the first sleeve 33 by a magnetic force. Then, the first developing roller 30 attracts (carries) the developer from the developer supplying screw 42 based on the magnetic force, and develops the electrostatic latent image formed on the rotating photosensitive drum 28Y (on the image bearing member) with the developer.

The first sleeve 33 is a non-magnetic cylindrical member having an outer diameter of 25 mm (radius r1=12.5 mm), and is rotationally driven around a rotation shaft 39. A rotational direction of the first sleeve 33 is a clockwise direction as indicated by an arrow in FIG. 2, and is a direction opposite to a rotational direction of the photosensitive drum 28Y in the present embodiment. Therefore, the first sleeve 33 and the photosensitive drum 28Y rotate in the same direction at positions facing each other. That is, forward development in which the photosensitive drum 28 rotates upward in a vertical direction at a position where the photosensitive drum 28 faces the first sleeve 33 is performed.

Figure 3:
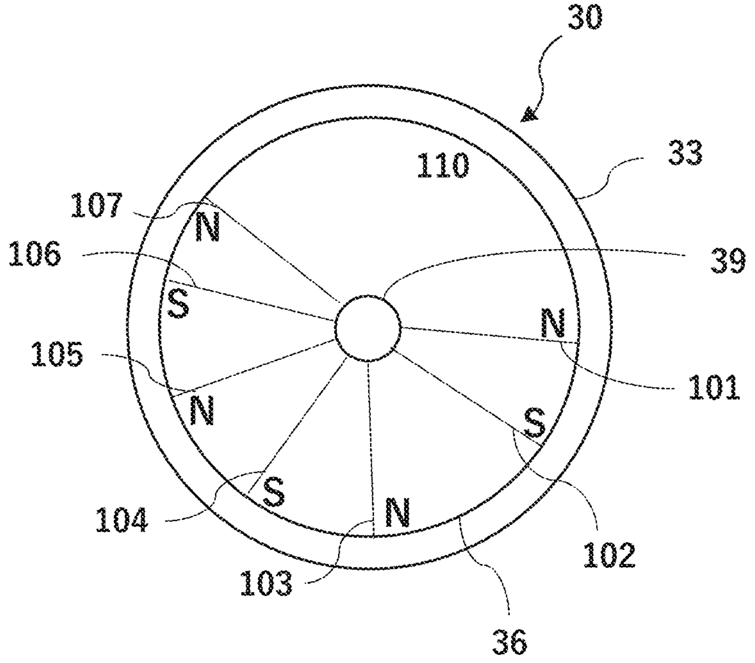
FIG. 3 is a view illustrating a magnetic pole arrangement of a first developing roller according to the embodiment.

The first magnet 36 is disposed inside the first sleeve 33 and has a plurality of magnetic poles 101 to 107 as illustrated in FIG. 3. Each of solid lines for the magnetic poles 101 to 107 illustrated in FIG. 3 indicates a position (peak position or pole position) of the maximum value of normal component distribution of a magnetic flux density of the first magnet 36. A space that allows rotation of the first sleeve 33 is disposed between an inner periphery of the first sleeve 33 and an outer periphery of the first magnet 36.

The developer attracted to the first sleeve 33 is fed toward the photosensitive drum 28Y by a rotation operation of the first sleeve 33, thereby developing the latent image formed on the photosensitive drum 28Y at a first developing position. After the latent image formed on the photosensitive drum 28Y is developed, the developer on the first sleeve 33 is fed to the vicinity of the second developing roller 31 by the rotation operation of the first sleeve 33. Then, near the closest positions of the first developing roller 30 and the second developing roller 31, the developer is peeled off from the first sleeve 33 by a magnetic field generated by the first magnet 36 within the first developing roller 30 and the second magnet 37 within the second developing roller 31, and is delivered onto the second sleeve 34.

The second developing roller 31 of the developing apparatus 1Y of the present embodiment is positioned higher than the first developing roller 30 in the vertical direction as described below. Therefore, delivery of the developer from the first sleeve 33 to the second sleeve 34 also needs to be performed upward in the vertical direction against gravity. Note that the first sleeve 33 and the second sleeve 34 are arranged with a gap of 3 mm between the closest portions.

The second developing roller 31 is a developer carrying member that is rotationally driven, is disposed downstream of the first developing roller 30 in the rotational direction of the photosensitive drum 28Y such that a rotation center O2 of the second developing roller 31 is positioned higher than a rotation center O1 of the first developing roller 30 in the vertical direction, and receives the developer delivered from the first developing roller 30 by the magnetic force (FIG. 2). In the present embodiment, the entire second developing roller 31 is positioned higher than the rotation center O1 of the first developing roller 30. Similarly to the first developing roller 30, the second developing roller 31 is disposed at a position adjacent to the photosensitive drum 28Y such that a rotation axis thereof is substantially parallel to the rotation axis of the photosensitive drum 28Y. Therefore, the rotation axes of the second developing roller 31 and the first developing roller 30 are substantially parallel to each other.

Such a second developing roller 31 includes a second sleeve (second rotatable developing member) 34 that rotates and the second magnet (fixed magnet) 37 that is provided non-rotatably inside the second sleeve 34 and attracts the developer to the surface of the second sleeve 34 by a magnetic force. Then, the second developing roller 31 receives the developer delivered from the first developing roller 30 (the first sleeve 33) based on the magnetic force, attracts (carries) the developer, and develops the electrostatic latent image formed on the rotating photosensitive drum 28Y with the developer. The peeling roller 32 described below is positioned on a side of the second developing roller 31.

The second sleeve 34 is a non-magnetic cylindrical member having an outer diameter of 25 mm (radius r2=12.5 mm), and is rotationally driven around a rotation shaft 40. A rotational direction of the second sleeve 34 is a clockwise direction, which is the same as that of the first sleeve 33, as indicated by an arrow in FIG. 2, and is a direction opposite to the rotational direction of the photosensitive drum 28Y in the present embodiment. Therefore, the second sleeve 34 and the photosensitive drum 28Y rotate in the same direction at positions facing each other. That is, forward development in which the photosensitive drum 28 rotates upward in the vertical direction at a position where the photosensitive drum 28 faces the second sleeve 34 is performed. The second sleeve 34 and the first sleeve 33 rotate in opposite directions at positions facing each other.

Figure 4:
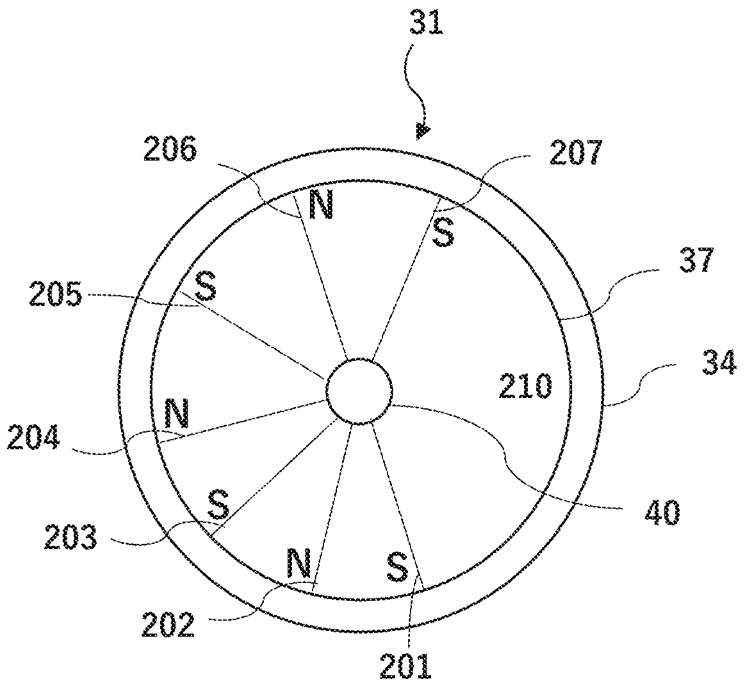
FIG. 4 is a view illustrating a magnetic pole arrangement of a second developing roller according to the embodiment.

The second magnet 37 is disposed inside the second sleeve 34 and has a plurality of magnetic poles 201 to 207 as illustrated in FIG. 4. Each of solid lines for the magnetic poles 201 to 207 illustrated in FIG. 4 indicates a position (peak position or pole position) of the maximum value of normal component distribution of a magnetic flux density of the second magnet 37. A space that allows rotation of the second sleeve 34 is disposed between an inner periphery of the second sleeve 34 and an outer periphery of the second magnet 37.

The developer attracted to the second sleeve 34 is fed toward the photosensitive drum 28Y by a rotation operation of the second sleeve 34, thereby developing the latent image formed on the photosensitive drum 28Y at a second developing position. After the latent image formed on the photosensitive drum 28Y is developed, the developer remaining on the second sleeve 34 is fed to the vicinity of the peeling roller 32 by the rotation operation of the second sleeve 34. Then, near the closest positions of the second developing roller 31 and the peeling roller 32, the developer is delivered from the second sleeve 34 to a third sleeve 35 of the peeling roller 32 by a magnetic field generated by the second magnet 37 within the second developing roller 31 and the third magnet 38 within the peeling roller 32.

The peeling roller 32 serving as a peeling portion is disposed on a side opposite to the photosensitive drum 28Y with respect to a rotation center of the second sleeve 34, and peels, from the second developing roller 31, the developer after developing the electrostatic latent image on the photosensitive drum 28Y by the second developing roller 31. Specifically, the peeling roller 32 is a developer carrying member that is rotationally driven, and is disposed between the second developing roller 31 and the developer collecting screw 44 such that a rotation center thereof is positioned higher than a rotation center O2 of the second developing roller 31.

The peeling roller (third rotatable member) 32 is disposed such that a rotation axis thereof is substantially parallel to the rotation axis of the second developing roller 31. The peeling roller 32 includes the third sleeve 35 that rotates and the third magnet (fixed magnet) 38 that is provided non-rotatably inside the third sleeve 35 and attracts the developer to the surface of the third sleeve 35 by a magnetic force, and is configured to receive the developer delivered from the second developing roller 31 based on the magnetic force.

The third sleeve 35 is a non-magnetic cylindrical member having an outer diameter of 18 mm (a radius of 9 mm), and is rotationally driven around a rotation shaft 41. A rotational direction of the third sleeve 35 is a counterclockwise direction as indicated by an arrow in FIG. 2, and is a direction opposite to the rotational direction of the second sleeve 34 in the present embodiment. Therefore, the third sleeve 35 and the second sleeve 34 rotate in the same direction at positions facing each other.

Figure 5:
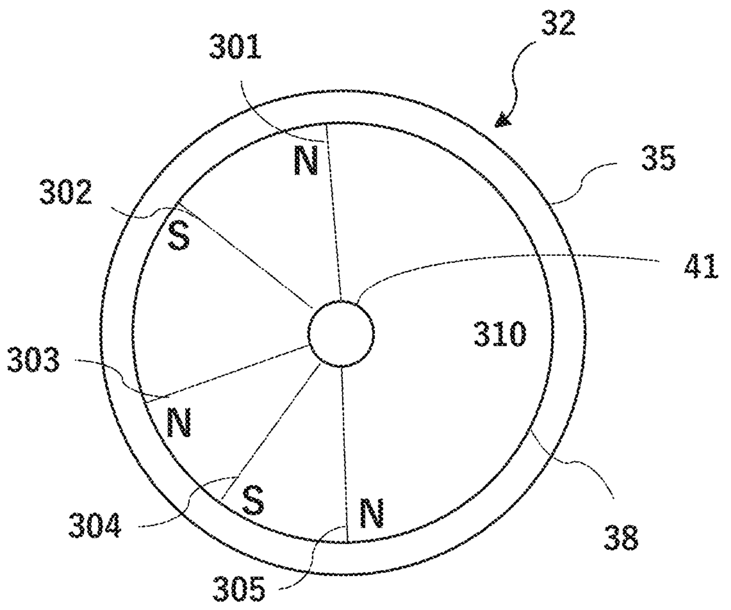
FIG. 5 is a view illustrating a magnetic pole arrangement of a peeling roller according to the embodiment.

The third magnet 38 is disposed inside the third sleeve 35 and has a plurality of magnetic poles 301 to 305 as illustrated in FIG. 5. Each of solid lines for the magnetic poles 301 to 305 illustrated in FIG. 5 indicates a position (peak position or pole position) of the maximum value of normal component distribution of a magnetic flux density of the third magnet 38. A space that allows rotation of the third sleeve 35 is disposed between an inner periphery of the third sleeve 35 and an outer periphery of the third magnet 38.

The developer attracted to the third sleeve 35 is fed downstream in the rotational direction by the rotation operation of the third sleeve 35, is peeled off from the third sleeve 35 by the third magnet 38 within the peeling roller 32 at a position close to the developer collecting screw 44, and falls toward a guide member 45 positioned lower in the vertical direction by its own weight. Then, the developer falling onto the guide member 45 is guided by its own weight toward the developer collecting screw 44.

The guide member 45 and the developer collecting screw 44 constitute a developer collecting portion 47 serving as a collecting portion (collecting chamber) that collects the developer peeled off from the third sleeve 35 of the peeling roller 32. In the developer collecting portion 47, the developer collecting screw 44 is disposed such that a rotation center is positioned lower than the rotation center of the peeling roller 32 in the vertical direction, and feeds the developer delivered (collected) from the peeling roller 32 while stirring the developer.

The guide member 45 serving as a guide portion is disposed below the peeling roller 32 in the vertical direction, and guides the developer peeled off by the peeling roller 32 toward the developer collecting screw 44. Such a guide member 45 has an inclined surface 45*a* on which the developer slides down by its own weight in order to more reliably guide the peeled developer toward the developer collecting screw 44. The inclined surface 45*a* is inclined with respect to a horizontal direction such that a portion positioned below the peeling roller 32 is positioned higher than a portion adjacent to the developer collecting screw 44.

The developer collecting screw 44 serving as a collecting member and a feeding portion feeds the collected developer to a developer circulating portion 46 described below. That is, the developer collecting screw 44 is a screw feeding member used to feed the developer sliding down the inclined surface of the guide member 45 and collected in one direction while stirring the developer.

The developer circulating portion 46 is a supply portion (supply chamber) for supplying the developer to the first developing roller 30, and the developer circulating portion 46 includes a regulating member 50, the developer supplying screw 42, and the developer stirring screw 43. In the developer circulating portion 46, the developer is supplied to the first developing roller 30 while being fed in the substantially horizontal direction and stirred by the developer supplying screw 42 and the developer stirring screw 43. As described above, the developer collected by the developer collecting portion 47 falls by its own weight and is introduced into the developer circulating portion 46.

The developer supplying screw 42, the developer stirring screw 43, and the developer collecting screw 44 are screw feeding members that feed the developer in one direction while stirring the developer, and the developer supplying screw 42 and the developer stirring screw 43 are positioned lower than the developer collecting screw 44 in the vertical direction. In addition, the developer supplying screw 42, the developer stirring screw 43, and the developer collecting screw 44 are disposed such that rotation axes thereof are substantially parallel to each other. The rotation axis of each screw is substantially parallel to the rotation axis of the first developing roller 30.

The developer supplying screw 42 is positioned between the first developing roller 30 and the developer stirring screw 43, and a partition wall 48 of the developing container 60 is disposed between the developer supplying screw 42 and the developer stirring screw 43. The partition wall 48 of the developing container 60 extends in a rotation axis direction of the developer supplying screw 42 and the developer stirring screw 43. The partition wall 48 has a communication port (not illustrated) for communication between a first feeding path 61 through which the developer is fed by the developer supplying screw 42 and a second feeding path 62 through which the developer is fed by the developer stirring screw 43.

The developer stirred by the developer collecting screw 44 passes through a communication port (not illustrated) formed in a partition wall 63 of the developing container 60 between the developer collecting screw 44 and the developer supplying screw 42, and falls toward the developer supplying screw 42 by its own weight. The guide member 45 described above is formed integrally with the partition wall 63, and the developer collecting screw 44 is disposed above the partition wall 63.

A position of the communication port through which the developer stirred by the developer collecting screw 44 falls by its own weight and is introduced into the developer circulating portion 46 is preferably disposed so as to avoid a region where the developer is supplied toward the first developing roller 30 (a middle portion of the developer supplying screw 42 in the rotation axis direction). In the present embodiment, it is assumed that the position of the communication port is a position within a range of a downstream end portion (terminal end portion) of the first feeding path 61, in which the developer supplying screw 42 is disposed, in a developer feeding direction.

The developer feeding directions of the developer supplying screw 42 and the developer stirring screw 43 are opposite to each other. A start end side (an upstream end side in the developer feeding direction) and a terminal end side (a downstream end side in the developer feeding direction) of the first feeding path 61 in which the developer supplying screw 42 is disposed communicate with a terminal end side and a start end side of the second feeding path 62 in which the developer stirring screw 43 is disposed via the communication port provided in the partition wall 48. Therefore, the developer circulates in a rotational direction of the developer supplying screw 42 and the developer stirring screw 43 indicated by arrows in FIG. 2 and in the substantially horizontal direction inside the developing container 60, and a part of the developer is supplied toward the first developing roller 30.

A developer replenishment port 51 (see FIG. 2) is provided above the developer stirring screw 43 in the developing container 60, and is connected to the developer storage 27Y (see FIG. 1). The developer replenishment port 51 is configured to be able to replenish the developer contained in the bottle loaded in the developer storage 27Y to the second feeding path 62 in which the developer stirring screw 43 is disposed.

As described above, since the weight ratio of the toner of the developer contained in the bottle of the developer storage 27Y is higher than the weight ratio of the toner of the developer in the developing apparatus 1Y, the weight ratio of the toner of the developer in the developing apparatus 1 can be maintained constant by adjusting the amount of developer to be replenished to the developer stirring screw 43.

A toner density detection sensor 49 (see FIG. 2) is provided to detect a toner density in the developer contained in the developer circulating portion 46. The toner density detection sensor 49 is a sensor that detects magnetic permeability of the developer. Since the toner density corresponds to the amount of toner consumption in the developing apparatus 1Y, the toner density is used for controlling developer replenishment from the developer storage 27Y. For example, when it is detected that the toner density is lower than a predetermined value, the developer is replenished from the developer storage 27Y. Since the magnetic permeability of the developer changes depending on the toner density, the toner density can be detected using the magnetic permeability.

The regulating member 50 is disposed adjacent to the first developing roller 30, and is used to regulate the amount of developer supplied from the developer circulating portion 46 to the first developing roller 30. For example, the regulating member 50 can be configured to regulate the amount of developer attracted to the first developing roller 30 based on a gap between the surface of the first sleeve 33 of the first developing roller 30 and an end portion of the regulating member 50.

In a developer circulation path in the developing container 60, the developer is fed in the substantially horizontal direction while being stirred in the developer circulating portion 46, is then supplied to the first developing roller 30, and is delivered from the first developing roller 30 to the second developing roller 31 positioned higher than the first developing roller 30 based on the magnetic force. Then, the developer is delivered again from the second developing roller 31 to the peeling roller 32 positioned on the side of the second developing roller 31 based on the magnetic force, is then peeled off from the peeling roller 32 by the third magnet 38 within the peeling roller 32, is further collected by the developer collecting portion 47, and is introduced again into the developer circulating portion 46.

As described above, in the present embodiment, a two-component development method is used as a development method, and a mixture of a nonmagnetic toner having a negative charging polarity and a magnetic carrier is used as the developer. The nonmagnetic toner is obtained by incorporating a colorant, a wax component, or the like in a resin such as a polyester resin or a styrene acrylic resin, pulverizing or polymerizing the resin into powder, and adding fine powder of titanium oxide, silica, or the like to the surface. The magnetic carrier is obtained by applying resin coating to a surface layer of a core formed of ferrite particles or resin particles kneaded with magnetic powder. A toner density (the weight ratio of the toner contained in the developer) in the developer in an initial state is 8% in the present embodiment.

Note that the magnetic carrier preferably has a magnetization amount per unit weight of 40 $Am^2/kg$ or more and 80 $Am^2/kg$ or less in an applied magnetic field of 1000 oersted (79577 A/m). When the magnetization amount of the magnetic carrier is reduced, there is an effect of suppressing scavenging by a magnetic brush, but adhesion of the magnetic carrier to the nonmagnetic sleeve by the magnet inside the developing roller becomes difficult, and image defects such as adhesion of the magnetic carrier to the photosensitive drum may occur. Note that the scavenging is a phenomenon in which the developed toner is scraped off by the magnetic carrier that has once completed the development. When the magnetization amount of the magnetic carrier is larger than the above range, an image defect may occur due to the scavenging by the magnetic brush as described above. In the present embodiment, a magnetic carrier whose magnetization amount per unit weight is 63 $Am^2/kg$ is used.

The magnetization amount of the magnetic carrier was measured using a vibrating magnetic field-type automatic magnetic characteristic recording apparatus BHV-30 manufactured by RIKEN Denshi Co., Ltd. For a magnetic characteristic value of the magnetic carrier, an external magnetic field of 1000 oersted is created, and a strength of magnetization at that time is obtained. The magnetic carrier is packed in a cylindrical plastic container so as to be sufficiently dense. In this state, a magnetization moment is measured, the actual weight when a sample is put is measured, and the strength of magnetization ($Am^2/kg$) is obtained.

A true specific gravity of the magnetic carrier is determined by a dry automatic density type AccuPyc 1330 manufactured by Shimadzu Corporation. In the present embodiment, a magnetic carrier having a true specific gravity (density) of 4.6 ($g/cm^3$) was used. In addition, a magnetic carrier having a weight average diameter of 35 μm (radius b=17.5 μm) was used.

In general, in the two-component development method using a toner and a carrier, both the toner and the carrier are charged to predetermined polarities by being brought into frictional contact with each other, and thus has a feature that stress received by the toner is less than that of a one-component development method using a one-component developer. On the other hand, the long-term use increases dirt (spent) attached to the surface of the carrier, and thus an ability to charge the toner gradually decreases. As a result, problems such as fogging and toner scattering occur. In order to prolong the life of a two-component developing apparatus, it is conceivable to increase the amount of carriers contained in the developing apparatus. In this case, however, the size of the developing apparatus may be increased, which is not desirable.

In order to solve the above problem related to the two-component developer, an auto carrier refresh (ACR) method is adopted in the present embodiment. The ACR method is a method of suppressing an increase in deteriorated carriers by replenishing a new developer from the developer storage 27Y into the developing apparatus 1Y little by little and discharging the developer with deteriorated charging performance little by little from a discharge port (not illustrated) of the developing apparatus 1Y. As a result, the deteriorated carrier in the developing apparatus 1Y is gradually replaced with the new carrier, and the charging performance of the carrier in the developing apparatus 1Y can be kept substantially constant.

Magnetic Pole of Each Magnet

Next, the magnetic pole configurations of the first magnet 36, the second magnet 37, and the third magnet 38 within the first developing roller 30, the second developing roller 31, and the peeling roller 32 illustrated in FIGS. 3, 4, and 5 will be described.

As illustrated in FIG. 3, the first magnet 36 within the first developing roller 30 has the plurality of magnetic poles 101, 102, 103, 104, 105, 106, and 107. The magnetic pole 107 is a delivery pole for delivering the developer from the first developing roller 30 to the second developing roller 31. The magnetic poles 101 to 107 are arranged in number order in the rotational direction of the first sleeve 33. As described above, each of the solid lines of the magnetic poles 101 to 107 illustrated in FIG. 3 represents a position (a pole position) of a peak value (maximum value) of a magnitude of a normal component Br of the magnetic flux density of the first magnet 36 with respect to the surface of the first sleeve 33. The same applies to the magnetic poles 201 to 207 of the second magnet 37 illustrated in FIG. 4 and the magnetic poles 301 to 305 of the third magnet 38 illustrated in FIG. 5.

The magnetic pole 107 serving as the delivery pole (first magnetic pole) is a magnetic pole for delivering the developer from the first sleeve 33 to the second sleeve 34 by a magnetic field generated in cooperation with the second magnet 37 of the second developing roller 31, and hereinafter, may be referred to as the delivery pole 107. The magnetic pole 101 is an N pole, and is used to attract the developer supplied from the developer supplying screw 42 onto the first sleeve 33. The magnetic poles 102, 103, 104, 105, and 106 are an S pole, an N pole, an S pole, an N pole, and an S pole, respectively, and are used to feed the developer attracted by the magnetic pole 101 upward as the first sleeve 33 rotates. The magnetic pole 107 is an N pole, and delivers the developer from the first sleeve 33 to the second sleeve 34 facing the first sleeve 33 by a magnetic field generated in cooperation with the magnetic pole 201 in the second magnet 37 within the second developing roller 31 as described above.

In the present embodiment, a low magnetic force portion 110 having a magnetic force lower than that of the delivery pole 107 is formed by a repulsive magnetic field generated in cooperation between the delivery pole 107 and the magnetic pole 101 serving as a second magnetic pole disposed downstream of the delivery pole 107 in the rotational direction of the first sleeve 33 and having the same magnetic polarity as the delivery pole 107. The low magnetic force portion 110 promotes delivery of the developer from the first sleeve 33 to the second sleeve 34. Note that the low magnetic force portion 110 has almost no magnetic force in the present embodiment, but may have a low magnetic force, and for example, may be a magnetic pole having a magnetic force (the normal component Br of the magnetic flux density) of 5 mT or less. The same applies to a low magnetic force portion 210 of the second magnet 37 illustrated in FIG. 4 and a low magnetic force portion 310 of the third magnet 38 illustrated in FIG. 5.

As illustrated in FIG. 4, the second magnet 37 within the second developing roller 31 has the plurality of magnetic poles 201, 202, 203, 204, 205, 206, and 207. The magnetic pole 201 is a receiving pole for the second developing roller 31 to receive the developer from the first developing roller 30. The magnetic poles 201 to 207 are arranged in number order in the rotational direction of the second sleeve 34.

The magnetic pole 201 serving as the receiving pole (third magnetic pole) is a magnetic pole for attracting the developer from the first sleeve 33 to the second sleeve 34 by a magnetic field generated in cooperation with the magnetic pole 107 of the first magnet 36 of the first developing roller 30, and hereinafter, may be referred to as the receiving pole 201. The magnetic pole (fifth magnetic pole) 207 is a magnetic pole for delivering the developer from the second sleeve 34 to the third sleeve 35 by a magnetic field generated in cooperation with the third magnet 38 of the peeling roller 32.

Further, the receiving pole 201 is an S pole having a magnetic polarity different from that of the delivery pole 107, and is used to attract the developer from the first developing roller 30 (first sleeve 33) onto the second sleeve 34 as described above. The magnetic poles 202, 203, 204, 205, and 206 are an N pole, an S pole, an N pole, an S pole, and an N pole, respectively, and are used to feed the developer attracted by the magnetic pole 201 upward as the second sleeve 34 rotates. The magnetic pole 207 is an S pole, and delivers the developer having passed through a development region between the second magnet 37 and the photosensitive drum 28Y corresponding to the magnetic pole 203 from the second sleeve 34 to the third sleeve 35 facing the second sleeve 34 by a magnetic field generated in cooperation with the magnetic pole 303 of the third magnet 38 within the peeling roller 32.

In the present embodiment, the low magnetic force portion 210 having a magnetic force lower than that of the magnetic pole 207 is formed by a repulsive magnetic field generated in cooperation between the receiving pole 201 and the magnetic pole 207 serving as a fifth magnetic pole disposed upstream of the receiving pole 201 in the rotational direction of the second sleeve 34 and having the same magnetic polarity as the receiving pole 201. The low magnetic force portion 210 promotes delivery of the developer from the first sleeve 33 to the second sleeve 34. In addition, the low magnetic force portion 210 can prevent the developer from being attracted to the closest portions of the first sleeve 33 and the second sleeve 34, so that a pressure applied to the developer can be suppressed.

As illustrated in FIG. 5, the third magnet 38 within the peeling roller 32 has the plurality of magnetic poles 301, 302, 303, 304, and 305. The magnetic poles 301 to 305 are arranged in number order in the rotational direction of the third sleeve 35.

The magnetic pole 303 is an N pole having a magnetic polarity different from that of the magnetic pole 207, and is used to attract the developer peeled off from the second sleeve 34 to the third sleeve 35 as described above. The magnetic poles 301, 302, and 304 are an N pole, an S pole, and an S pole, respectively, and are used to feed the developer on the third sleeve 35 as the third sleeve 35 rotates. In particular, the magnetic pole 304 is used to feed the developer attracted by the magnetic pole 303 downward as the third sleeve 35 rotates. The magnetic pole 305 is an N pole, and is a peeling pole used to peel off the developer attracted to the third sleeve 35 from the third sleeve 35 by a repulsive magnetic field generated in cooperation with the magnetic pole 301 having the same magnetic polarity.

Magnetic Pole Arrangement Relationship

Figure 6:
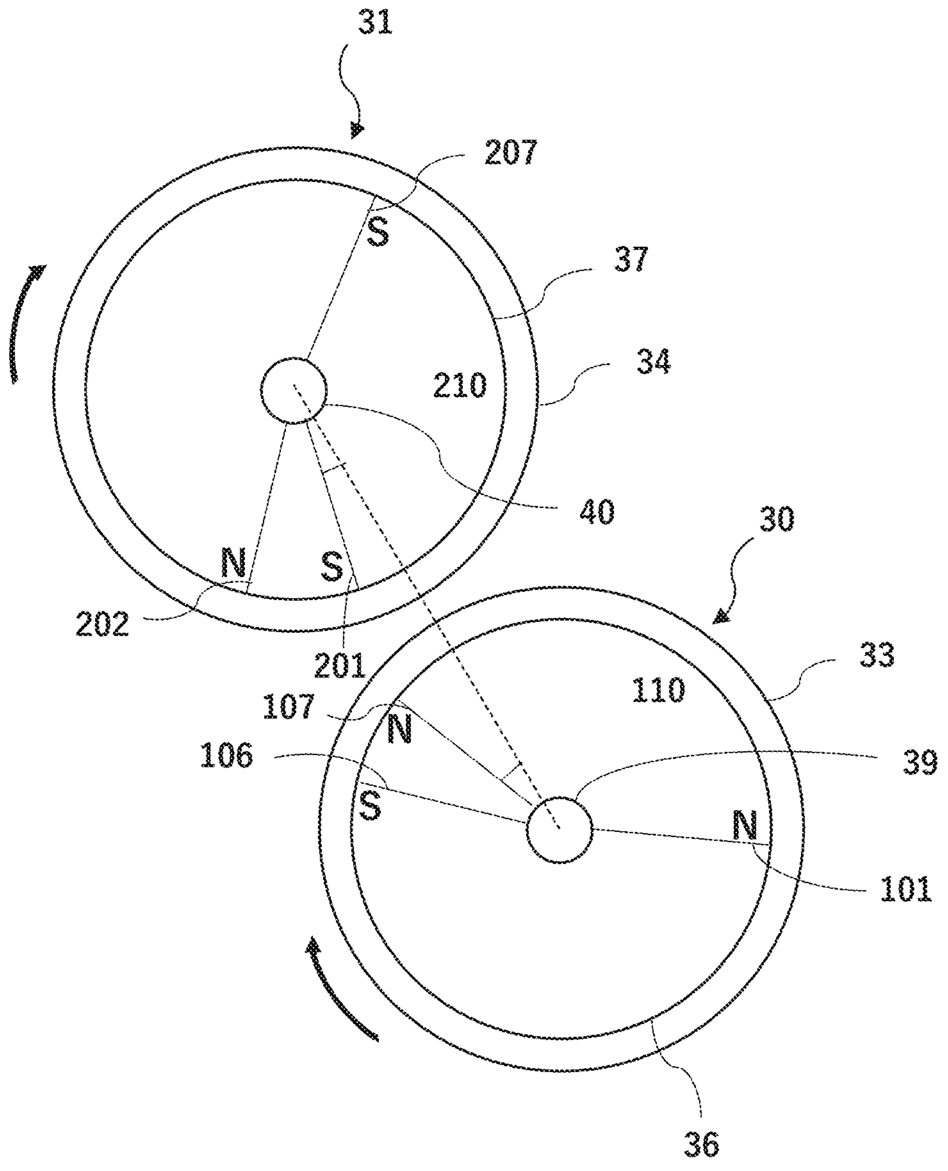
FIG. 6 is a view illustrating a magnetic pole arrangement relationship between the first developing roller and the second developing roller according to the embodiment.

Next, an arrangement relationship between the magnetic poles of the first magnet 36 disposed inside the first developing roller 30 and the magnetic poles of the second magnet 37 disposed inside the second developing roller 31 will be described with reference to FIGS. 6 to 8. FIG. 6 is a conceptual view illustrating arrangement of the first developing roller 30 and the second developing roller 31 of the present embodiment, and particularly illustrates a layout of the delivery pole 107 of the first magnet 36 of the first developing roller 30 and the receiving pole 201 of the second magnet 37 of the second developing roller 31. Note that some magnetic poles are omitted in the drawing to avoid complexity.

Figure 7:
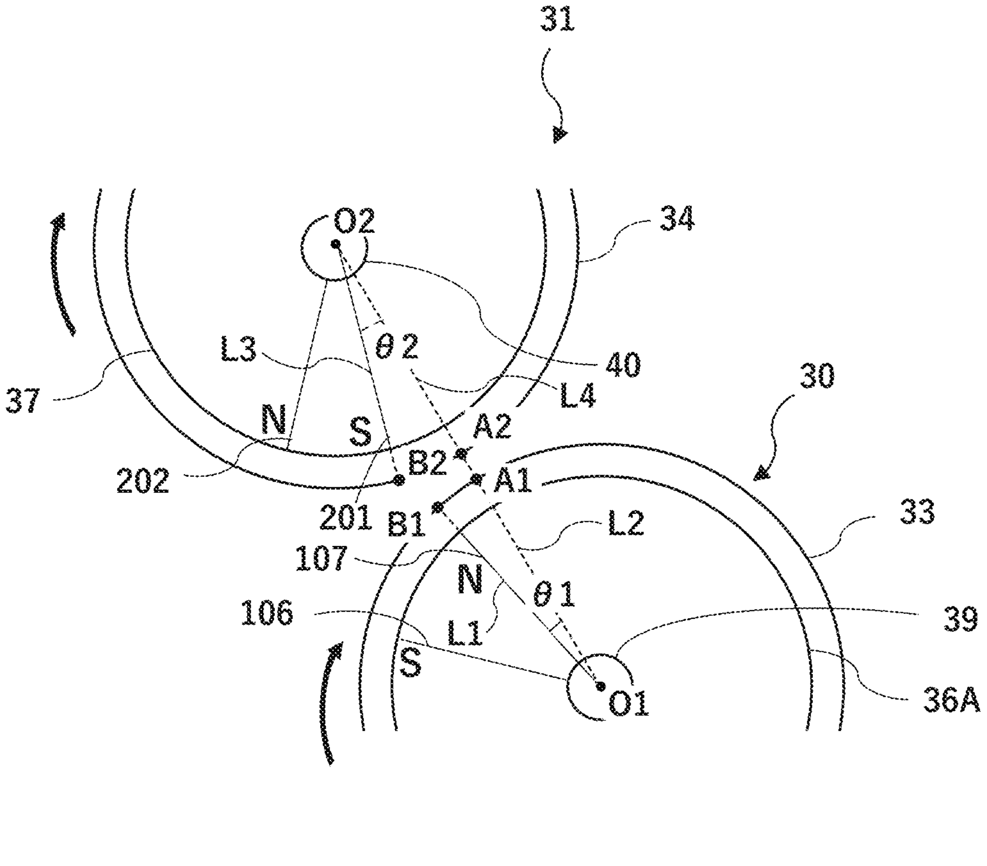
FIG. 7 is a detailed view illustrating a magnetic pole arrangement relationship between a first developing roller and a second developing roller according to a comparative example.
Figure 8:
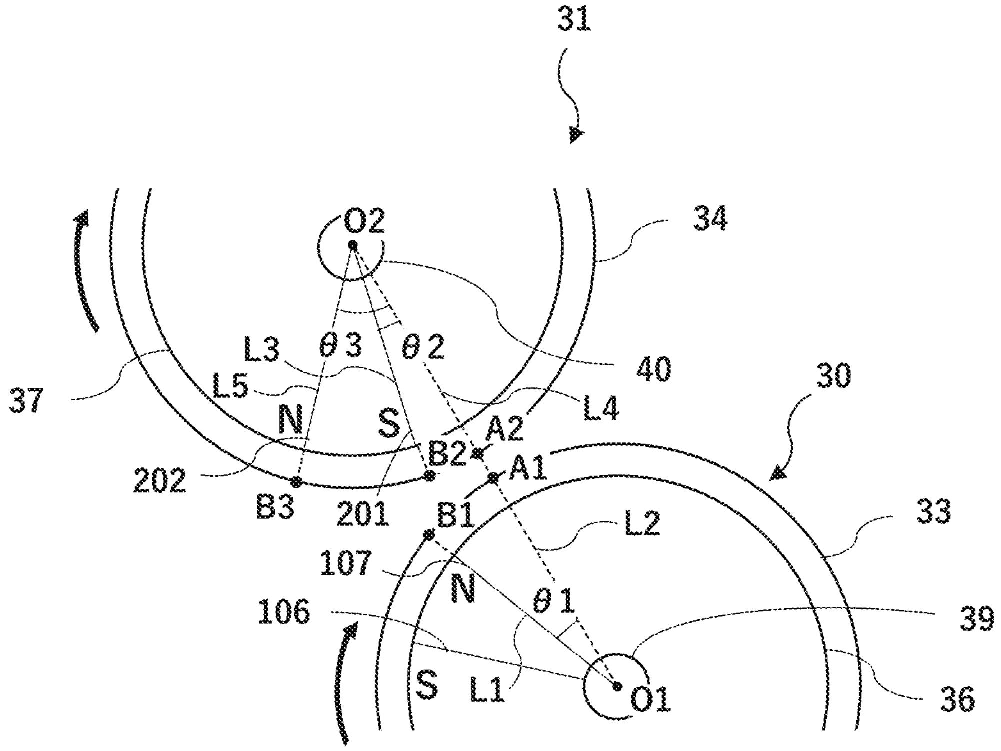
FIG. 8 is a detailed view illustrating the magnetic pole arrangement relationship between the first developing roller and the second developing roller according to the embodiment.

FIGS. 7 and 8 illustrate a schematic configuration of a region where the first developing roller 30 and the second developing roller 31 face each other, that is, a neighboring region where the delivery pole 107 of the first magnet 36 or 36A of the first developing roller 30 and the receiving pole 201 of the second magnet 37 of the second developing roller 31 face each other. FIG. 7 illustrates a configuration of a comparative example, and the first developing roller 30 includes the first magnet 36A. FIG. 8 illustrates a configuration of an example, and the first developing roller 30 includes the first magnet 36.

In FIGS. 7 and 8, the center O2 of the second developing roller 31 is positioned higher than the center O1 of the first developing roller 30 in the vertical direction. This means that the delivery of the developer from the first sleeve 33 to the second sleeve 34 is performed upward against the gravity as described above.

Intersection points A1 and A2 between a line (a dotted line in the drawing) connecting the center O1 of the first developing roller 30 and the center O2 of the second developing roller 31, and the first sleeve 33 and the second sleeve 34 are the closest positions of the sleeves 33 and 34. That is, the intersection point A1 is the closest position (first closest position) of the first sleeve 33 with respect to the second sleeve 34. The intersection point A2 is the closest position (second closest position) of the second sleeve 34 with respect to the first sleeve 33.

Further, a pole position (a position (peak position, first pole position, or first maximum position) of the maximum value of the magnitude of the normal component Br of the magnetic flux density) of the delivery pole 107 of the first magnet 36 or 36A of the first developing roller 30 on the first sleeve 33 is B1, and a pole position (a position (peak position, second pole position, or second maximum position) of the maximum value of the magnitude of the normal component Br of the magnetic flux density) of the receiving pole 201 of the second magnet 37 of the second developing roller 31 on the second sleeve 34 is B2. In this case, the first pole position B1 of the delivery pole 107 on the first sleeve 33 is positioned upstream of the first closest position A1 of the first sleeve 33 with respect to the second sleeve 34 in the rotational direction of the first sleeve 33. The second pole position B2 of the receiving pole 201 on the second sleeve 34 is positioned downstream of the second closest position A2 of the second sleeve 34 with respect to the first sleeve 33 in the rotational direction of the second sleeve 34.

When the first pole position B1 of the delivery pole 107 and the second pole position B2 of the receiving pole 201 are arranged in this manner, the developer fed on the first sleeve 33 of the first developing roller 30 is delivered to the second sleeve 34 of the second developing roller 31 before reaching the closest positions A1 and A2 of both the sleeves 33 and 34. Since the closest positions A1 and A2 are spatially narrower than other positions of both the sleeves 33 and 34, when the developer passes through the closest positions A1 and A2, a large pressure is applied to the developer, and thus, the developer may deteriorate due to a shearing force or the like. Therefore, in the present embodiment, the arrangement of the first pole position B1 and the second pole position B2 is as described above.

Here, an angle formed by the pole position B1 of the delivery pole 107 of the first magnet 36 of the first developing roller 30 relative to the first closest position A1 of the first sleeve 33 with respect to the second sleeve 34 is θ1. That is, an angle formed by a line L1 connecting the first pole position B1 and the rotation center O1 of the first sleeve 33 and a line L2 connecting the first closest position A1 and the rotation center O1 of the first sleeve 33 is θ1. An angle formed by the pole position B2 of the receiving pole 201 of the second magnet 37 of the second developing roller 31 relative to the second closest position A2 of the second sleeve 34 with respect to the first sleeve 33 is θ2. That is, an angle formed by a line L3 connecting the second pole position B2 and the rotation center O2 of the second sleeve 34 and a line LA connecting the second closest position A2 and the rotation center O2 of the second sleeve 34 is θ2. In the comparative example illustrated in FIG. 7, $\theta 1<\theta 2$, and in the present embodiment illustrated in FIG. 8, $\theta 1>\theta 2$.

Assuming that the radius of the first sleeve 33 is r1 and the radius of the second sleeve is r2, a circumferential distance between the first closest position A1 and the first pole position B1 of the delivery pole 107 on the first sleeve 33 is $r1\times\theta 1$, and a circumferential distance between the second closest position A2 and the second pole position B2 of the receiving pole 201 on the second sleeve 34 is $r2\times\theta 2$, if θ1 and θ2 are in radians. As described above, the radii r1 and r2 of the first sleeve 33 and the second sleeve 34 of the developing apparatus 1Y of the present embodiment are both 12.5 mm.

Figure 15:
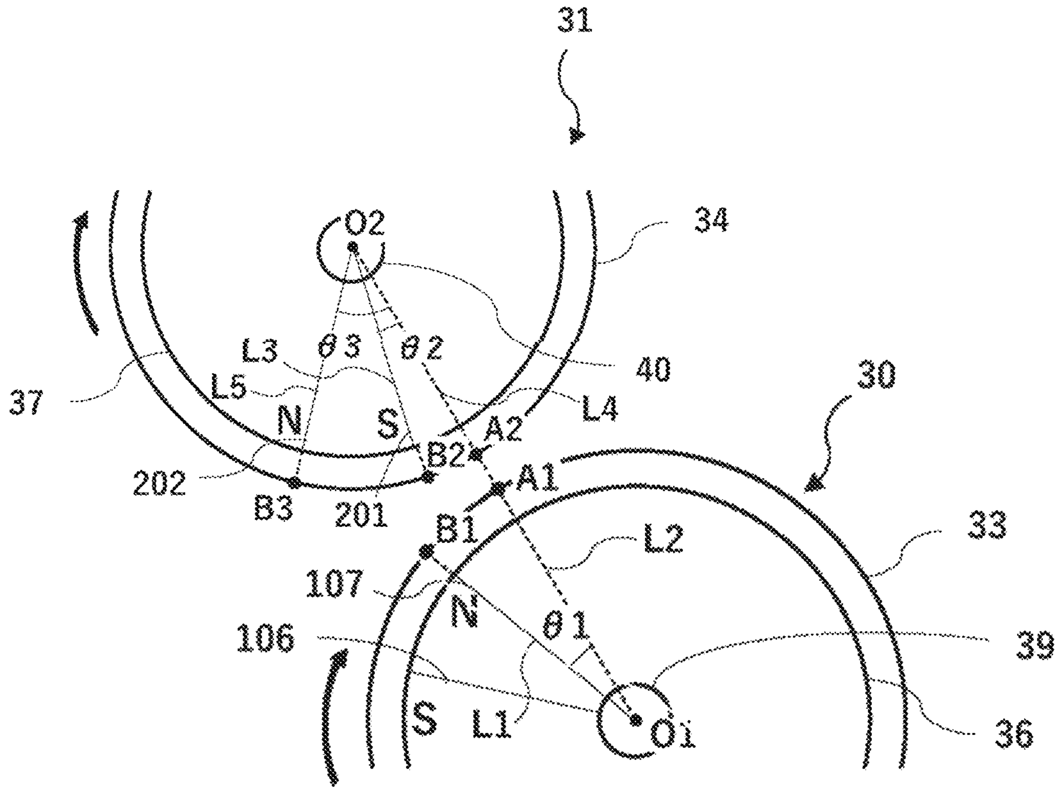
FIG. 15 is a detailed view illustrating the magnetic pole arrangement relationship between the first developing roller and the second developing roller according to another embodiment.

Therefore, in the comparative example illustrated in FIG. 7, since $\theta 1<\theta 2$, $(r1\times\theta 1)<(r2\times\theta 2)$. That is, the distance between the first closest position A1 and the first pole position B1 is shorter than the distance between the second closest position A2 and the second pole position B2. On the other hand, in the present embodiment illustrated in FIG. 8, since $\theta 1>\theta 2$, $(r1\times\theta 1)>(r2\times\theta 2)$. That is, the distance between the first closest position A1 and the first pole position B1 is longer than the distance between the second closest position A2 and the second pole position B2. In the present embodiment, a case where the radii r1 and r2 of the first sleeve 33 and the second sleeve 34 are the same has been described. However, even when the radii are different from each other, as shown in the embodiment illustrated in FIG. 15, it is sufficient if $(r1\times\theta 1)>(r2\times\theta 2)$.

As described above, the ideal delivery of the developer is performed such that the developer on the first sleeve 33 is fed on the first sleeve 33 in a state of receiving a force in a direction toward the center (O1) of the first sleeve 33 until reaching the first pole position B1 of the delivery pole 107, and after passing through the first pole position B1 of the delivery pole 107, the developer is smoothly delivered to the second sleeve 34 by receiving a force in a direction away from the center (O1) of the first sleeve 33, that is, in a direction toward the second sleeve 34 until reaching the first closest position A1 with respect to the second sleeve 34. When the developer is smoothly delivered as described above, retention of the developer between the two sleeves 33 and 34 is less likely to occur, and image defects due to developer deterioration associated with the retention can be suppressed.

In the case of the pole arrangement as in the comparative example illustrated in FIG. 7, there are the following problems in order to achieve smooth developer delivery as described above. In the comparative example of FIG. 7, the distance r1×θ1 from the first closest position A1 of the first sleeve 33 to the first pole position B1 of the delivery pole 107 is shorter than the distance r2×θ2 from the second closest position A2 of the second sleeve 34 to the second pole position B2 of the receiving pole 201. Therefore, the developer is fed on the first sleeve 33 in a state of receiving a force in a direction toward the center (O1) of the first sleeve 33, and reaches the pole position B1 of the delivery pole 107 after passing through a position facing the second pole position B2 of the receiving pole 201 of the second sleeve 34.

As a result, after the developer on the first sleeve 33 is fed to the first pole position B1 of the delivery pole 107, it is necessary to increase a magnitude (peak value) of (the normal component of) the magnetic flux density Br of the receiving pole 201 of the second magnet 37 of the second developing roller 31 in order to overcome the gravity and receive the force in the direction toward the second sleeve 34. When the magnitude of the magnetic flux density Br of the receiving pole 201 is increased, the developer is easily restrained at a position of the receiving pole 201, and a possibility that the developer deteriorates increases due to shearing accompanying the rotation of the second sleeve 34.

On the other hand, in the present embodiment illustrated in FIG. 8, the distance r1×θ1 from the first closest position A1 of the first sleeve 33 to the first pole position B1 of the delivery pole 107 is longer than the distance r2×θ2 from the second closest position A2 of the second sleeve 34 to the second pole position B2 of the receiving pole 201. Therefore, the developer is fed on the first sleeve 33 to the pole position B1 of the delivery pole 107 in a state of receiving the force in the direction toward the center (O1) of the first sleeve 33, and then reaches the position facing the second pole position B2 of the receiving pole 201 of the second sleeve 34.

As a result, after the developer on the first sleeve 33 is fed to the first pole position B1 of the delivery pole 107, the magnetic flux density derived from the delivery pole 107 of the first magnet 36 gradually decreases toward the downstream, and the force in the direction toward the center (O1) of the first sleeve 33 for the developer is gradually weakened. On the other hand, since the magnetic flux density derived from the receiving pole 201 of the second magnet 37 gradually increases toward the downstream as the distance to the position facing the receiving pole 201 decreases, the force in the direction toward the second sleeve 34, that is, the force in the direction away from the center (O1) of the first sleeve 33 gradually increases.

Then, after the developer on the first sleeve 33 is fed to the first pole position B1 of the delivery pole 107, the developer overcomes the gravity and receives the force in the direction toward the second sleeve 34, and smooth delivery of the developer is easily achieved. Therefore, in the present embodiment illustrated in FIG. 8, it is not necessary to forcibly increase the magnitude (peak value) of (the normal component of) the magnetic flux density Br of the receiving pole 201 of the second magnet 37 of the second developing roller 31 as in the comparative example illustrated in FIG. 7, and it is also possible to decrease a possibility that the developer deteriorates.

Figure 9:
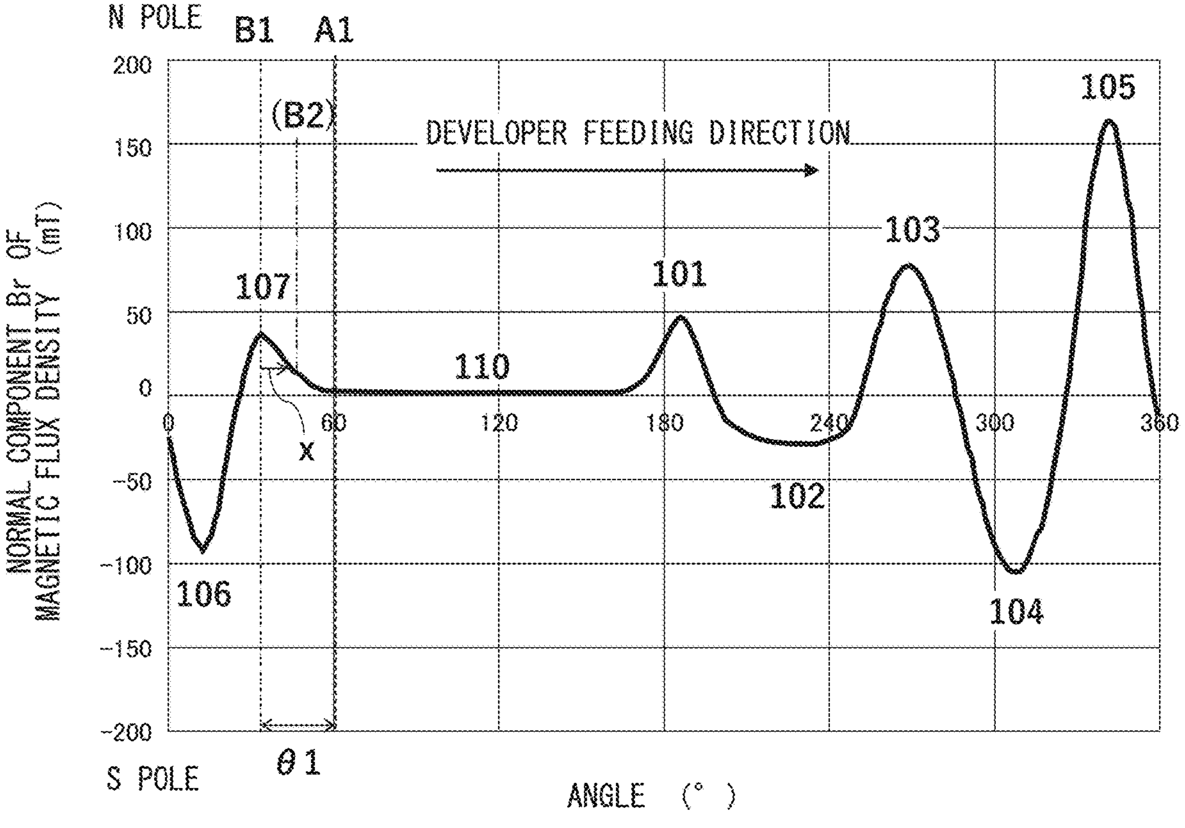
FIG. 9 is a graph illustrating a magnetic characteristic of the first developing roller according to the embodiment.
Figure 10:
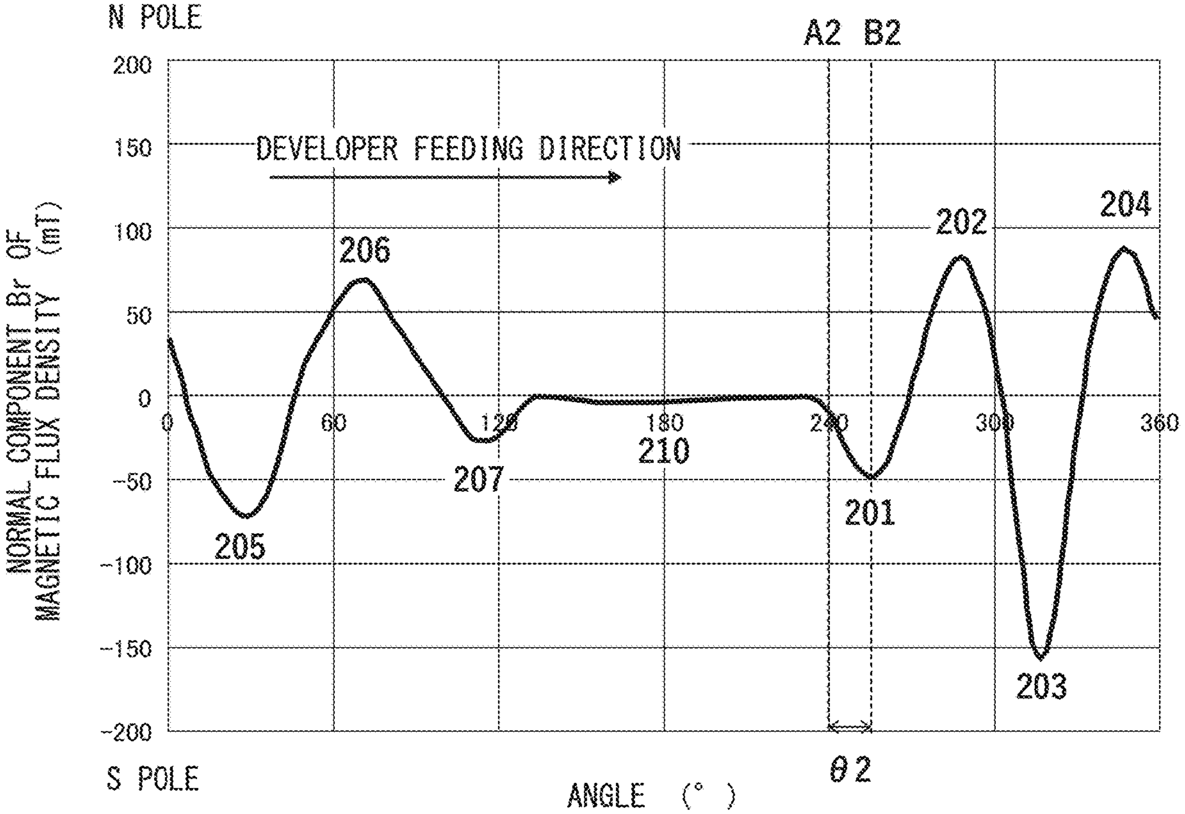
FIG. 10 is a graph illustrating a magnetic characteristic of the second developing roller according to the embodiment.

FIG. 9 is a view schematically illustrating the normal component Br distribution of the magnetic flux density on the first sleeve 33 by the first magnet 36 of the present embodiment. FIG. 10 is a view schematically illustrating the normal component Br distribution of the magnetic flux density on the second sleeve 34 by the second magnet 37 of the present embodiment. Note that the magnetic flux density Br accurately refers to a component of the magnetic flux density B in a normal direction relative to the sleeve. Hereinafter, the "normal component Br of the magnetic flux density" may be simply referred to as the "magnetic flux density" according to the convention. It is assumed that the simple term "magnetic flux density" refers to the "normal component Br of the magnetic flux density". The magnetic flux density Br (the normal component Br of the magnetic flux density) of each magnet was measured using a magnetic field measuring instrument ("MS-9902" manufactured by F. W. BELL) with a distance between a probe, which is a member of the magnetic field measuring instrument, and the surfaces of the sleeves 33 and 34 being about 100 μm.

In FIG. 9, positions corresponding to the first closest position A1 of the first sleeve 33 and the first pole position B1 of the delivery pole 107 are indicated by chain lines. FIG. 10 illustrates positions corresponding to the second closest position A2 of the second sleeve 34 and the second pole position B2 of the receiving pole 201. The angle θ1 formed by the first closest position A1 of the first sleeve 33 and the first pole position B1 of the delivery pole 107 is larger than the angle θ2 formed by the second closest position A2 of the second sleeve 34 and the second pole position B2 of the receiving pole 201.

Figure 11:
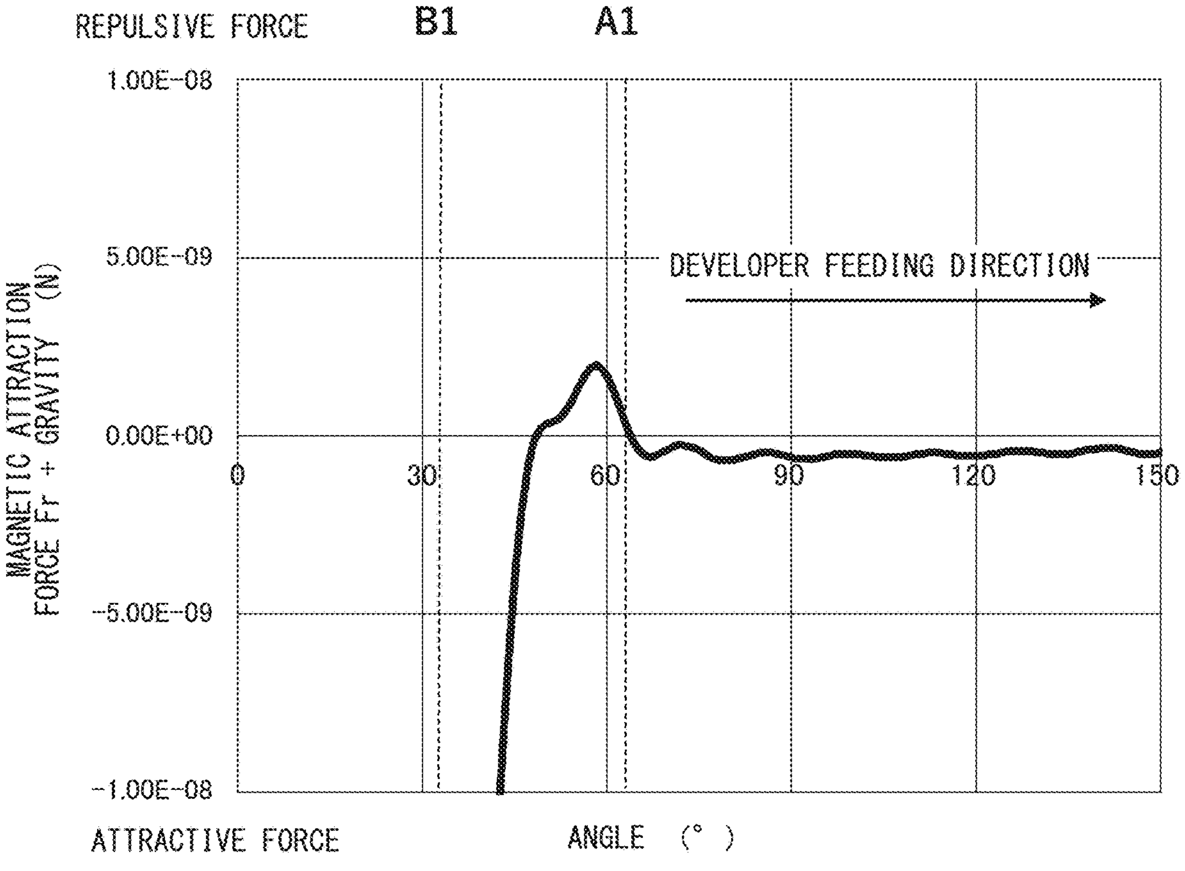
FIG. 11 is a graph illustrating a force acting on a magnetic carrier on the first developing roller according to the embodiment.

FIG. 11 schematically illustrates a magnetic attraction force Fr by which the magnetic carrier of the developer on the first sleeve 33 is attracted in the direction toward the center (O1) of the first sleeve 33. Hereinafter, the "magnetic attraction force Fr in the direction toward the center (O1) of the first sleeve" may be simply referred to as the "magnetic attraction force". It is assumed that the simple term "magnetic attraction force" refers to the "magnetic attraction force Fr in the direction toward the center (O1) of the first sleeve 33". The magnetic attraction force Fr of the first sleeve 33 can be derived from the normal component Br of the magnetic flux density, and is expressed by the following Formula 1.

$$F_r = \frac{\mu - \mu_0}{\mu_0(\mu + 2\mu_0)} 2\pi b^3 \left(B_r \frac{\partial B_r}{\partial r} + B_\theta \frac{\partial B_\theta}{\partial r}\right) \quad \text{Mathematical Formula 1}$$

In Formula 1, μ represents the magnetic permeability of the magnetic carrier, μ0 represents vacuum magnetic permeability, and b represents the radius of the magnetic carrier. A tangential component Bθ of the magnetic flux density is obtained from the following Formula 2 using the value of the normal component Br of the magnetic flux density.

$$B_\theta = -\frac{\partial A_z(r, \theta)}{\partial r} \left(A_z(R, \theta) = \int_0^\theta R B_r d\theta\right) \quad \text{Mathematical Formula 2}$$

For the magnetic attraction force Fr received by the magnetic carrier on the first sleeve 33, it is necessary to consider an influence of the second magnet 37 in addition to an influence of the first magnet 36. For this reason, it is necessary that the normal component Br of the magnetic flux density and the tangential component Bθ of the magnetic flux density in the calculation of the magnetic attraction force Fr of Formula 1 above are obtained by considering the influences of both the first magnet 36 and the second magnet 37. In addition, it is necessary to consider an influence of the gravity on the magnetic carrier. Therefore, FIG. 11 illustrates an outline of a force (=magnetic attraction force Fr+gravity) by which the magnetic carrier of the developer on the first sleeve 33 is attracted in the direction toward the center (O1) of the first sleeve 33 and which is obtained by considering the influences of both the first magnet 36 and the second magnet 37 and adding the influence of the gravity. The gravity on the magnetic carrier is represented by a product Mg of a weight M of the magnetic carrier and a gravitational acceleration g, and the weight M of the magnetic carrier is obtained by a product of a volume ($4\pi b^3/3$) of the magnetic carrier and the true specific gravity (density). In the graph, a portion related to the delivery of the developer is illustrated in an enlarged manner, and positions corresponding to the first closest position A1 of the first developing roller 30 and the first pole position B1 of the delivery pole 107 are also indicated by dotted lines at the same time.

As can be seen from FIG. 11, the force (magnetic attraction force Fr+gravity) received by the magnetic carrier on the first sleeve 33 in the direction toward the center (O1) of the first sleeve 33 is an attractive force until the magnetic carrier reaches the first pole position B1 of the delivery pole 107, and then changes to a repulsive force against the gravity until the magnetic carrier reaches the first closest position A1 while being fed. That is, a component in the direction toward the rotation center O1 of the first sleeve 33 in the force which acts on the carrier included in the developer on the first sleeve 33 and is obtained by adding the gravity to the magnetic attraction force by both the first magnet 36 and the second magnet 37 is the attractive force at the first pole position B1, and changes from the attractive force to the repulsive force while the developer is fed from the first pole position B1 to the first closest position A1 in the rotational direction of the first sleeve 33. The repulsive force refers to the force in the direction away from the center (O1) of the first sleeve 33. Therefore, it is considered that the magnetic carrier on the first sleeve 33 is fed on the first sleeve 33 until reaching the first pole position B1 of the delivery pole 107, and then the developer is smoothly delivered from the first sleeve 33 to the second sleeve 34 upward in the vertical direction until reaching the first closest position A1.

Figure 12:
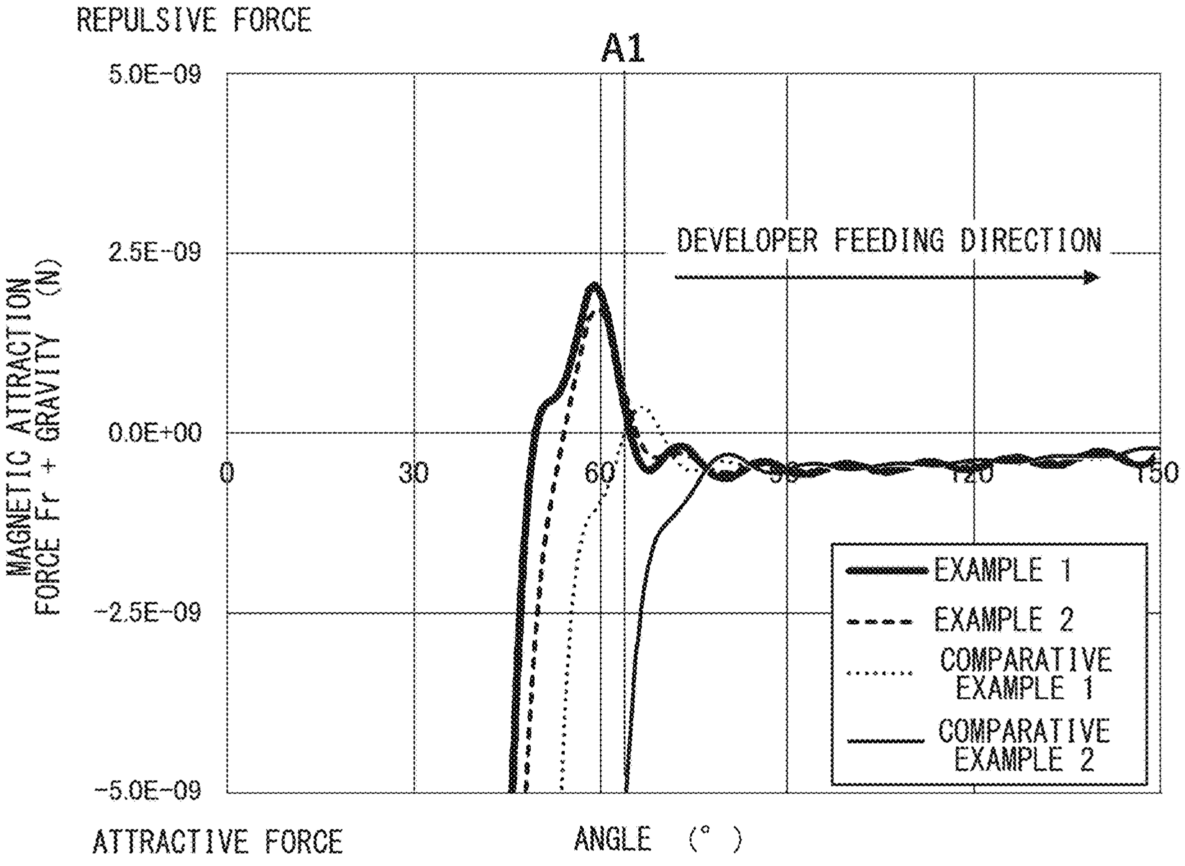
FIG. 12 is a graph illustrating a force acting on the magnetic carrier on the first developing roller according to Examples 1 and 2 and Comparative Examples 1 and 2.

FIG. 12 illustrates the force (magnetic suction force Fr+gravity) received by the magnetic carrier on the first sleeve 33 in the direction toward the center (O1) of the first sleeve 33 when the angle θ1 between the first pole position B1 of the delivery pole 107 and the first closest position A1 is changed while the angle θ2 between the second pole position B2 of the receiving pole 201 and the second closest position A2 is fixed under the condition that the magnitude of the magnetic flux density Br of the delivery pole 107 of the first developing roller 30 is 40 mT and the magnitude of the magnetic flux density Br of the receiving pole 201 of the second developing roller 31 is 50 mT. Each condition is shown in Table 1.

TABLE 1

| | Delivery pole Br | r1 | θ1 | r1 × θ1 | Receiving pole Br | r2 | θ2 | r2 × θ2 |
|---|---|---|---|---|---|---|---|---|
| Example 1 | 40 mT | 12.5 mm | 26° | 5.6 mm | 50 mT | 12.5 mm | 16° | 3.5 mm |
| Example 2 | 40 mT | 12.5 mm | 23° | 5.0 mm | 50 mT | 12.5 mm | 16° | 3.5 mm |
| Comparative example 1 | 40 mT | 12.5 mm | 16° | 3.5 mm | 50 mT | 12.5 mm | 16° | 3.5 mm |
| Comparative example 2 | 40 mT | 12.5 mm | 6° | 1.3 mm | 50 mT | 12.5 mm | 16° | 3.5 mm |

In Table 1, it is to be understood that θ1 and θ2 must be converted to radians before being multiplied by r1 and r2 respectively.

In Examples 1 and 2, the distance r1×θ1 from the first closest position A1 of the first sleeve 33 to the first pole position B1 of the delivery pole 107 is longer than the distance r2×θ2 from the second closest position A2 of the second sleeve 34 to the second pole position B2 of the receiving pole 201. At this time, it can be seen from distribution of the magnetic attraction force Fr+gravity of Example 1 and Example 2 in FIG. 12 that the repulsive force is generated upstream of the first closest position A1. Therefore, it is considered that the developer fed on the first sleeve 33 to the first pole position B1 of the delivery pole 107 is smoothly delivered to the second sleeve 34 against the gravity until reaching the first closest position A1. In actual studies by the inventors, developer deterioration due to idle rotation was suppressed in the case of these configurations. The idle rotation is an operation of rotating the first developing roller 30, the second developing roller 31, the peeling roller 32, the developer supplying screw 42, the developer stirring screw 43, and the developer collecting screw 44 of the developing apparatus in a state where the developer is contained in the developing container 60 without accompanying a developing operation of developing the electrostatic latent image on the photosensitive drum with the developer.

Meanwhile, in Comparative Example 2, the distance r1×θ1 from the first closest position A1 of the first sleeve 33 to the first pole position B1 of the delivery pole 107 is shorter than the distance r2×θ2 from the second closest position A2 of the second sleeve 34 to the second pole position B2 of the receiving pole 201. At this time, it can be seen from the distribution of the magnetic attraction force Fr+gravity of Comparative Example 2 in FIG. 12 that the repulsive force against the gravity is not generated. Therefore, it is considered that the delivery of the developer fed on the first sleeve 33 to the first pole position B1 of the delivery pole 107 to the second sleeve 34 is delayed, and the retention is likely to occur. In actual studies by the inventors, developer deterioration due to the idle rotation occurred in the case of the configuration of Comparative Example 2.

In Comparative Example 1, the distance r1×θ1 from the first closest position A1 of the first sleeve 33 to the first pole position B1 of the delivery pole 107 is the same as the distance r2×θ2 from the second closest position A2 of the second sleeve 34 to the second pole position B2 of the receiving pole 201. At this time, it can be seen from the distribution of the magnetic attraction force Fr+gravity in Comparative Example 1 in FIG. 12 that the repulsive force against the gravity is generated, but the magnitude of the repulsive force is small. A generation timing of the repulsive force is a timing immediately before the upstream of the first closest position A1 or a timing when the first closest position A1 is reached. Therefore, the delivery of the developer fed on the first sleeve 33 to the first pole position B1 of the delivery pole 107 to the second sleeve 34 slightly lacks smoothness, and thus, it is considered that the retention in the vicinity of the first closest position A1 starts to occur. In actual studies by the inventors, in the case of the configuration of Comparative Example 1, the deterioration of the developer due to the idle rotation was more suppressed than in Comparative Example 2, but the deterioration of the developer due to the idle rotation occurred more than in Example 1 and Example 2.

As described above, the deterioration of the developer can be suppressed by making the distance $r1\times\theta1$ from the first closest position A1 of the first sleeve 33 to the first pole position B1 of the delivery pole 107 longer than the distance $r2\times\theta2$ from the second closest position A2 of the second sleeve 34 to the second pole position B2 of the receiving pole 201, that is, by satisfying $r1\times\theta1>r2\times\theta2$. In addition, if the deterioration of the developer can be suppressed, occurrence of image defects can be suppressed.

The pole position of the magnet slightly fluctuates in manufacturing. In consideration of this point, it is preferable to increase the distance by a distance corresponding to 3°, that is, it is preferable that the above-described relationship between the pole position and the closest position satisfies $r1\times(\theta1-3°)\geq r2\times\theta2$. In addition, it is more preferable to increase the distance by a distance corresponding to 5°, that is, to satisfy $r1\times(\theta1-5°)\geq r2\times\theta2$. Further, it is more preferable to increase the distance by a distance corresponding to 7°, that is, to satisfy $r1\times(\theta1-7°)\geq r2\times\theta2$. With the above configuration, it is possible to suppress the deterioration of the developer even when the pole position of the magnet in manufacturing fluctuates. In the inequalities, it is to be understood that either all angles should be in radians or all angles should be in degrees before being multiplied by r1 or r2. Provided the same units are consistently used, each side of the inequality is multiplied by a factor.

As described above, in the present embodiment, the effect of suppressing the deterioration of the developer can be obtained by making the distance $r1\times\theta1$ from the first closest position A1 of the first sleeve 33 to the first pole position B1 of the delivery pole 107 longer than the distance $r2\times\theta2$ from the second closest position A2 of the second sleeve 34 to the second pole position B2 of the receiving pole 201. However, the effect of further suppressing the deterioration of the developer can be obtained by adopting the following configuration.

In the magnetic flux density Br distribution (normal component Br distribution of the magnetic flux density) on the first sleeve 33 by the first magnet 36 of the first developing roller 30 in FIG. 9, an angle x on a downstream side of the first pole position B1 in the rotational direction of the first sleeve 33 is shown within a half-peak width of the normal component of the magnetic flux density of the delivery pole 107. For reference, FIG. 9 also illustrates the position facing the second pole position B2 of the receiving pole 201 of the second sleeve 34. At this time, it is preferable that the distance $r1\times\theta1$ from the first closest position A1 of the first sleeve 33 to the first pole position B1 of the delivery pole 107 is longer than the distance $r2\times\theta2$ from the second closest position A2 of the second sleeve 34 to the second pole position B2 of the receiving pole 201 by a distance corresponding to the angle x on the downstream side in the rotational direction of the first sleeve 33 within the half-peak width of the magnetic flux density Br distribution of the delivery pole 107, that is, $r1\times(\theta1-x)\geq r2\times\theta2$.

In the above configuration, the developer fed on the first sleeve 33 reaches the position facing the second pole position B2 of the receiving pole 201 of the second sleeve 34 after the magnetic flux density Br of the delivery pole 107 decreases by half or more. Therefore, the developer having passed through the first pole position B1 of the delivery pole 107 on the first sleeve 33 can receive the magnetic attraction force from the magnetic flux density Br of the receiving pole 201 when the magnetic flux density Br of the delivery pole 107 is sufficiently weakened. As a result, the developer fed on the first sleeve 33 to the first pole position B1 of the delivery pole 107 is smoothly delivered to the second sleeve 34 against the gravity until reaching the first closest position A1.

The angle x on the downstream side in the rotational direction of the first sleeve 33 within the half-peak width of the magnetic flux density Br distribution of the delivery pole 107 of the first magnet 36 of Example 1 and Example 2 described above was 7°. In Example 2, the distance $r1\times\theta1$ from the first closest position A1 of the first sleeve 33 to the first pole position B1 of the delivery pole 107 is longer than the distance $r2\times\theta2$ from the second closest position A2 of the second sleeve 34 to the second pole position B2 of the receiving pole 201 by a distance corresponding to the angle of 7° on the downstream side within the half-peak width of the delivery pole ($r1\times(\theta1-7°)=r2\times\theta2$). Although the distance is further increased in Example 1, the repulsive force is not significantly different between Example 1 and Example 2 as can be seen in FIG. 12. It is considered that this is because, in Example 2, the distance was already increased by the distance corresponding to the angle of 7° on the downstream side within the half-value width of the delivery pole, and thus, a sufficient effect was obtained at that stage. In the inequalities, it is to be understood that either all angles should be in radians or all angles should be in degrees before being multiplied by r1 or r2. Provided the same units are consistently used, each side of the inequality is multiplied by a factor.

As described above, by making the distance $r1\times\theta1$ from the first closest position A1 of the first sleeve 33 to the first pole position B1 of the delivery pole 107 longer than the distance $r2\times\theta2$ from the second closest position A2 of the second sleeve 34 to the second pole position B2 of the receiving pole 201 by a distance corresponding to the angle x on the downstream side in the rotational direction of the first sleeve 33 within the half-peak width of the magnetic flux density Br distribution of the delivery pole 107 ($r1\times(\theta1-x)\geq r2\times\theta2$), it is possible to smoothly deliver the developer from the first sleeve 33 to the second sleeve 34 while more effectively suppressing the deterioration of the developer.

FIG. 8 illustrates a third pole position (third maximum position) B3 on the second sleeve 34 of the magnetic pole 202 (fourth magnetic pole) downstream of the receiving pole 201 in the rotational direction of the second sleeve 34. The magnetic pole 202 corresponds to a fourth magnetic pole of the second magnet 37 having a magnetic polarity different from that of the receiving pole 201 and positioned adjacent to the receiving pole 201 downstream of the receiving pole 201 in the rotational direction of the second sleeve 34. The position (peak position) of the maximum value of the normal component of the magnetic flux density of the magnetic pole 202 is defined as the third pole position B3. An angle formed by the magnetic pole 202 and the second closest position A2 is θ3. That is, an angle formed by a line L5 connecting the third pole position B3 and the rotation center O2 of the second sleeve 34 and a line L4 connecting the second closest position A2 and the rotation center O2 of the second sleeve 34 is θ3. FIG. 8 also illustrates the angle θ3.

It is not preferable that a portion from the first closest position A1 of the first sleeve 33 to the first pole position B1 of the delivery pole 107 faces the magnetic pole 202 that is downstream of the receiving pole 201 in the rotational direction of the second sleeve 34. This is because since the delivery pole 107 and the magnetic pole 202 have the same magnetic polarity, a repulsive magnetic field is generated by the poles with the same magnetic polarity facing each other, as a result of which a problem easily occurs in delivery of the developer. Therefore, it is preferable that the distance r1×θ1 from the first closest position A1 of the first sleeve 33 to the first pole position B1 of the delivery pole 107 is shorter than a distance r2×θ3 from the second closest position A2 of the second sleeve 34 to the third pole position B3 of the magnetic pole 202, that is, r1×θ1<r2×θ3. In the present embodiment, θ3=47°, which is sufficiently larger than θ1 of the present embodiment. In the present embodiment, r1=r2=12.5 mm. Therefore, r1×θ1<r2×θ3 as illustrated in FIG. 8.

When the distance r1×θ1 from the first closest position A1 of the first sleeve 33 to the first pole position B1 of the delivery pole 107 is longer than the distance r2×θ2 from the second closest position A2 of the second sleeve 34 to the second pole position B2 of the receiving pole 201 as in Examples 1 and 2, a sufficient repulsive force is generated upstream of the first closest position A1 in the distribution of the magnetic attraction force Fr+gravity as illustrated in FIG. 12. Therefore, in such a configuration, even when the magnitude of (the normal component of) the magnetic flux density Br of the receiving pole 201 is decreased, a sufficient repulsive force can be obtained. When the magnitude of (the normal component of) the magnetic flux density Br of the receiving pole 201 can be decreased, the developer is less likely to be restrained at the position of the receiving pole 201, and the deterioration of the developer due to shearing accompanying the rotation of the second sleeve 34 can be further suppressed.

Figure 13:
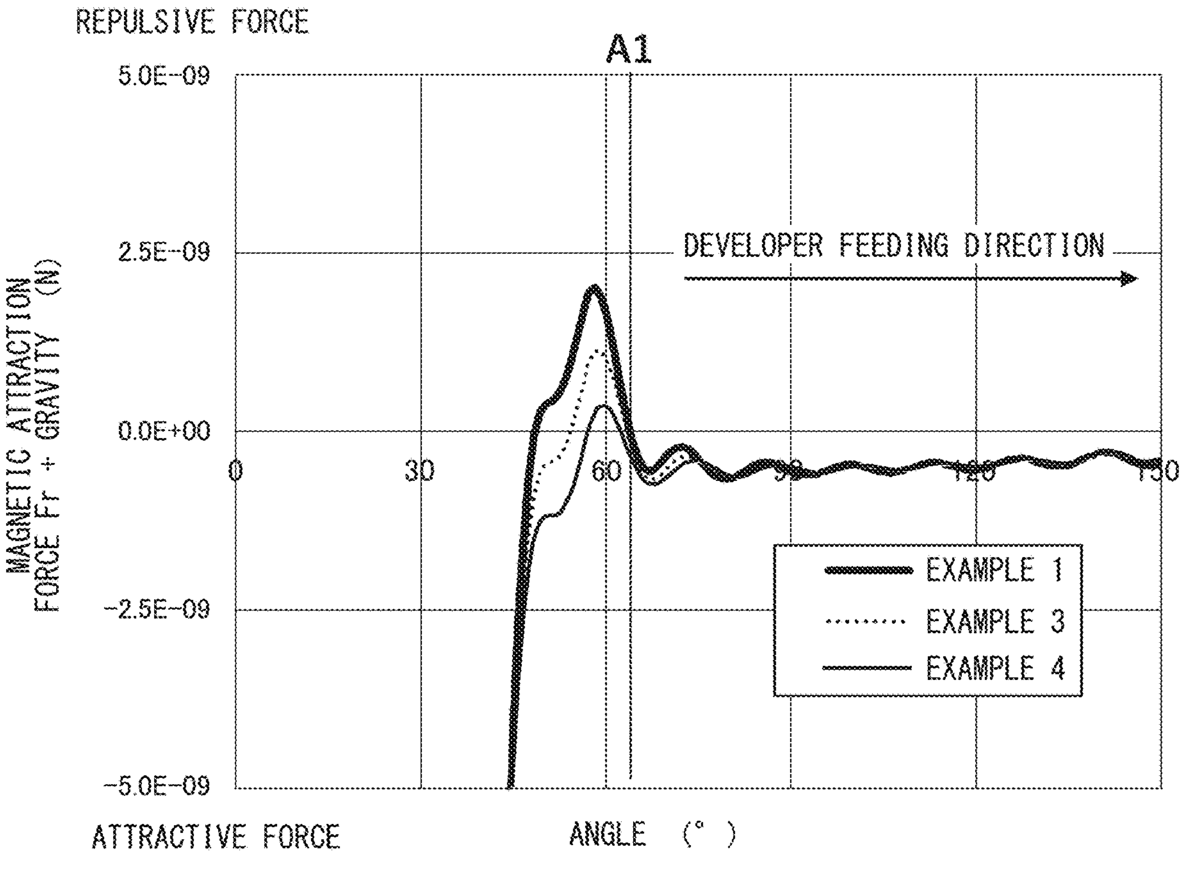
FIG. 13 is a graph illustrating a force acting on the magnetic carrier on the first developing roller according to Examples 1, 3, and 4.

FIG. 13 illustrates the force (magnetic attraction force Fr+gravity) received by the magnetic carrier on the first sleeve 33 in the direction toward the center (O1) of the first sleeve 33 when the magnitude of the magnetic flux density Br of the receiving pole 201 of the second developing roller 31 is changed in a case where the angle θ1 between the first pole position B1 of the delivery pole 107 and the first closest position A1 and the angle θ2 between the second pole position B2 of the receiving pole 201 and the second closest position A2 are fixed and the magnitude of the magnetic flux density Br of the delivery pole 107 of the first developing roller 30 is 40 mT. Each condition is shown in Table 2. FIG. 13 also illustrates the results of Example 1 in Table 1 for comparison.

TABLE 2

| | Delivery pole Br | r1 | θ1 | r1 × θ1 | Receiving pole Br | r2 | θ2 | r2 × θ2 |
|---|---|---|---|---|---|---|---|---|
| Example 3 | 40 mT | 12.5 mm | 26° | 5.6 mm | 40 mT | 12.5 mm | 16° | 3.5 mm |
| Example 4 | 40 mT | 12.5 mm | 26° | 5.6 mm | 30 mT | 12.5 mm | 16° | 3.5 mm |

In Table 2, it is to be understood that θ1 and θ2 must be converted to radians before being multiplied by r1 and r2 respectively.

As can be seen from the distribution of the magnetic attraction force Fr+gravity in FIG. 13, even when the magnitude of the magnetic flux density Br of the receiving pole 201 is equal to or smaller than the magnitude of the magnetic flux density Br of the delivery pole 107 as in Example 3 and Example 4, the repulsive force is generated upstream of the first closest position A1. Therefore, it is considered that the developer fed on the first sleeve 33 to the first pole position B1 of the delivery pole 107 is smoothly delivered to the second sleeve 34 against the gravity until reaching the first closest position A1. In actual studies by the inventors, in the case of these configurations, the deterioration of the developer due to the idle rotation was suppressed, and was more suppressed than when the magnitude of the magnetic flux density Br of the receiving pole 201 of Example 1 is 50 mT.

It is considered that this is because since the magnitude of (the normal component of) the magnetic flux density Br of the receiving pole 201 was able to be reduced, the developer was less likely to be restrained at the position of the receiving pole 201, and the deterioration of the developer due to shearing accompanying the rotation of the second sleeve 34 was further suppressed. Therefore, as long as the repulsive force is generated upstream of the first closest position A1 in the distribution of the magnetic attraction force Fr+gravity, the magnitude of (the normal component of) the magnetic flux density Br of the receiving pole 201 can be decreased to make the developer be less likely to be restrained at the position of the receiving pole 201 and further suppress the deterioration of the developer due to shearing accompanying the rotation of the second sleeve 34.

The magnitude of (the normal component of) the magnetic flux density Br of the receiving pole 201 in Example 4 is smaller than that in Example 3. However, the deterioration of the developer due to the idle rotation was almost the same between Example 3 and Example 4. Although the magnitude of (the normal component of) the magnetic flux density Br of the receiving pole 201 is smaller in Example 4, the repulsive force generated upstream of the first closest position A1 is also smaller in FIG. 13. Therefore, the point that a force for restraining the developer at the position of the receiving pole 201 is small is advantageous for suppressing the deterioration of the developer due to the idle rotation, whereas the point that a force for moving the developer to the second sleeve 34 is small is disadvantageous for suppressing the deterioration of the developer due to the idle rotation. For this reason, the deterioration of the developer is considered to be substantially the same between Examples 3 and 4. As described above, it is not preferable to decrease the magnitude of (the normal component of) the magnetic flux density Br of the receiving pole 201 to such an extent that no repulsive force is generated upstream of the first closest position A1 in the distribution of the magnetic attraction force Fr+gravity.

The magnitude of (the normal component of) the magnetic flux density Br of the receiving pole 201 is preferably 0.5 times or more the magnitude of (the normal component of) the magnetic flux density Br of the delivery pole 107. As in Example 4, the magnitude of (the normal component of) the magnetic flux density Br of the receiving pole 201 is more preferably 0.75 times or more, still more preferably 1.0 times or more the magnitude of (the normal component of) the magnetic flux density Br of the delivery pole 107.

On the other hand, as described above, when the magnitude of (the normal component of) the magnetic flux density Br of the receiving pole 201 is excessively increased, the developer is likely to be restrained at the position of the receiving pole 201, and thus, there is a possibility that the developer is likely to deteriorate due to shearing accompanying the rotation of the second sleeve 34. Therefore, the magnitude of (the normal component of) the magnetic flux density Br of the receiving pole 201 is preferably 1.5 times or less, more preferably 1.25 times or less the magnitude of (the normal component of) the magnetic flux density Br of the delivery pole 107.

Figure 14:
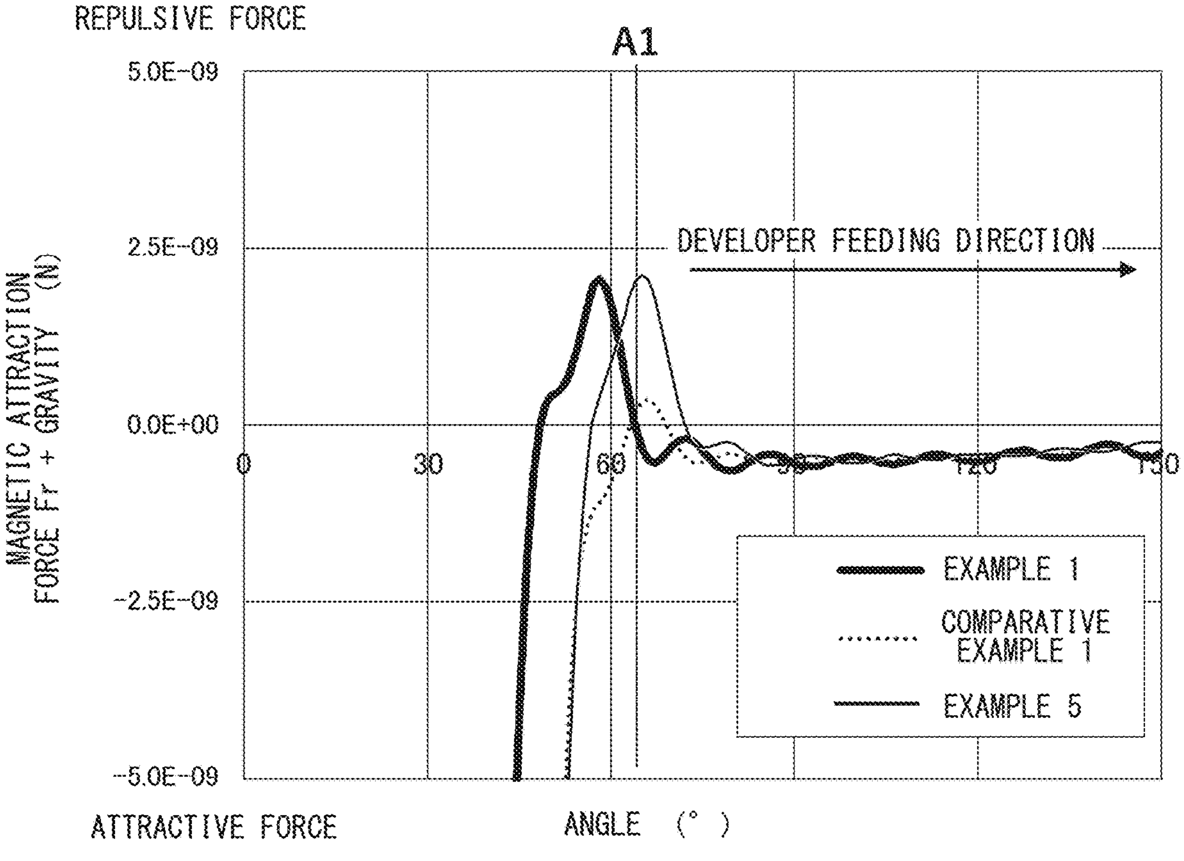
FIG. 14 is a graph illustrating a force acting on the magnetic carrier on the first developing roller according to Examples 1 and 5 and Comparative Example 1.

Similarly to Examples 1 and 2 and Comparative Examples 1 and 2, FIG. 14 illustrates the magnetic attraction force Fr (+gravity) received by the magnetic carrier on the first sleeve 33 in the direction toward the center (O1) of the first sleeve 33 when the angle θ2 between the second pole position B2 of the receiving pole 201 and the second closest position A2 is changed while the angle θ1 between the first pole position B1 of the delivery pole 107 and the first closest position A1 is the same as that in Comparative Example 1 under the condition that the magnitude of the magnetic flux density Br of the delivery pole 107 of the first developing roller 30 is 40 mT and the magnitude of the magnetic flux density Br of the receiving pole 201 of the second developing roller 31 is 50 mT. The condition is shown in Table 3. FIG. 14 also illustrates the results of Example 1 and Comparative Example 1.

TABLE 3

| | Delivery pole Br | r1 | θ1 | r1 × θ1 | Receiving pole Br | r2 | θ2 | r2 × θ2 |
|---|---|---|---|---|---|---|---|---|
| Example 5 | 40 mT | 12.5 mm | 16° | 3.5 mm | 50 mT | 12.5 mm | 6° | 3.5 mm |

In Table 3, it is to be understood that θ1 and θ2 must be converted to radians before being multiplied by r1 and r2 respectively.

As can be seen from the distribution of the magnetic attraction force Fr (+gravity) in FIG. 14, in Example 5, the repulsive force is generated upstream of the first closest position A1. In actual studies by the inventors, developer deterioration due to idle rotation was suppressed in the case of these configurations.

As compared with Comparative Example 1, Example 1 has achieved r1×θ1>r2×θ2 by changing the angle θ1 between the first pole position B1 of the delivery pole 107 and the first closest position A1, and Example 5 has achieved r1×θ1>r2×θ2 by changing the angle θ2 between the second pole position B2 of the receiving pole 201 and the second closest position A2, and thus a similar effect is obtained. This shows that a relative positional relationship between the first pole position B1 of the delivery pole 107 and the second pole position B2 of the receiving pole 201 is important, and means for achieving the relative positional relationship is not limited.

OTHER EMBODIMENTS

The present invention is not limited to the configuration of each embodiment described above. For example, the image forming apparatus 100 is not limited to the MFP, and may be a copier, a printer, or a facsimile machine. Further, the configurations of the developer supplying screw 42, the developer stirring screw 43, and the developer collecting screw 44 are not particularly limited as long as the developer can be fed, and for example, a spiral blade or a paddle blade can be applied.

In the above embodiment, the configuration in which the first sleeve 33 and the photosensitive drum 28Y rotate in the same direction at the positions facing each other and the second sleeve 34 and the photosensitive drum 28Y rotate in the same direction at the positions facing each other has been described, but the present technology is not limited thereto. The rotation center O2 of the second developing roller 31 may be positioned higher than the rotation center O1 of the first developing roller 30 in the vertical direction, the first sleeve 33 and the photosensitive drum 28Y may rotate in opposite directions at the positions facing each other, and the second sleeve 34 and the photosensitive drum 28Y may rotate in opposite directions at the positions facing each other. That is, counter development in which the photosensitive drum 28 rotates downward in the vertical direction at a position where the photosensitive drum 28 faces the first developing roller 30, and the photosensitive drum 28 rotates downward in the vertical direction at a position where the photosensitive drum 28 faces the second developing roller 31 is performed. The present technology can also be applied to such a configuration. In a case where three or more developing rollers are provided, the present technology can also be applied to any two developing rollers.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-150218, filed Sep. 15, 2023, which is hereby incorporated by reference herein in its entirety.

What is claimed is:

1. A developing apparatus comprising:

a first rotatable developing member to which a developer including a toner and a carrier is supplied, the first rotatable developing member being configured to carry and feed the developer to a first developing position;

a first magnet provided non-rotatably and stationarily inside the first rotatable developing member, the first magnet having a first magnetic pole and a second magnetic pole provided downstream of the first magnetic pole and adjacent to the first magnetic pole in a rotational direction of the first rotatable developing member and having the same magnetic polarity as that of the first magnetic pole;

a second rotatable developing member disposed to face the first rotatable developing member and configured to receive the developer delivered from the first rotatable developing member by a magnetic field generated by the first magnet, the second rotatable developing member being configured to carry and feed the developer to a second developing position, the second rotatable developing member having a rotation axis positioned higher than a rotation axis of the first rotatable developing member in a vertical direction, the rotational direction of the first rotatable developing member at a first closest position where the first rotatable developing member is closest to the second rotatable developing member on an outer surface of the first rotatable developing member being opposite to a rotational direction of the second rotatable developing member at a second closest position where the second rotatable developing member is closest to the first rotatable developing member on an outer surface of the second rotatable developing member; and a second magnet provided non-rotatably and stationarily inside the second rotatable developing member, the second magnet having a third magnetic pole and a fourth magnetic pole, the third magnetic pole being disposed to face the first magnetic pole and having a different magnetic polarity from that of the first magnetic pole, and the fourth magnetic pole being provided downstream of the third magnetic pole and adjacent to the third magnetic pole in the rotational direction of the second rotatable developing member and having a different magnetic polarity from that of the third magnetic pole, wherein a first maximum position where a magnetic flux density of the first magnetic pole in a normal direction relative to an outer peripheral surface of the first rotatable developing member is maximum is positioned downstream of the first developing position and upstream of the first closest position in the rotational direction of the first rotatable developing member, a second maximum position where a magnetic flux density of the third magnetic pole in a normal direction relative to an outer peripheral surface of the second rotatable developing member is maximum is positioned downstream of the second closest position and upstream of the second developing position in the rotational direction of the second rotatable developing member, a third maximum position where a magnetic flux density of the fourth magnetic pole in the normal direction relative to the outer peripheral surface of the second rotatable developing member is maximum is positioned downstream of the second maximum position and upstream of the second developing position in the rotational direction of the second rotatable developing member, a relationship of $r1\times\theta1 > r2\times\theta2$ is satisfied, in a case where $r1$ represents a radius of the first rotatable developing member, $r2$ represents a radius of the second rotatable developing member, $\theta1$ represents an angle from the first maximum position to the first closest position in the rotational direction of the first rotatable developing member, and $\theta2$ represents an angle from the second closest position to the second maximum position in the rotational direction of the second rotatable developing member, and a relationship of $r1\times\theta1<r2\times\theta3$ is satisfied in a case where $\theta3$ represents an angle from the second closest position to the third maximum position in the rotational direction of the second rotatable developing member.

2. The developing apparatus according to claim 1, wherein a relationship of $r1\times(\theta1-x)\geq r2\times\theta2$ is satisfied in a case where x represents an angle on a downstream side of the first maximum position in the rotational direction of the first rotatable developing member within a half-peak width of the magnetic flux density of the first magnetic pole in the normal direction relative to the outer peripheral surface of the first rotatable developing member.

3. The developing apparatus according to claim 1, wherein a relationship of $r1\times(\theta1-3^\circ)\geq r2\times\theta2$ is satisfied.

4. The developing apparatus according to claim 1, wherein a relationship of $r1\times(\theta1-5^\circ)\geq r2\times\theta2$ is satisfied.

5. The developing apparatus according to claim 1, wherein a relationship of $r1\times(\theta1-7^\circ\geq r2\times\theta2$ is satisfied.

6. The developing apparatus according to claim 1, wherein the radius of the second rotatable developing member is the same as the radius of the first rotatable developing member.

7. The developing apparatus according to claim 1, wherein the radius of the second rotatable developing member is different from the radius of the first rotatable developing member.

8. The developing apparatus according to claim 1, wherein the second magnet further has a fifth magnetic pole provided upstream of the third magnetic pole and adjacent to the third magnetic pole in the rotational direction of the second rotatable developing member and having the same magnetic polarity as that of the third magnetic pole.

9. The developing apparatus according to claim 1, wherein the first magnet has a plurality of magnetic poles including the first magnetic pole and the second magnetic pole, and the number of the plurality of magnetic poles is seven.

10. The developing apparatus according to claim 1, wherein the second magnet has a plurality of magnetic poles including the third magnetic pole, and the number of the plurality of magnetic poles is seven.

11. The developing apparatus according to claim 1, further comprising a developing container configured to contain the developer, wherein the developer contained in the developing container is supplied to the first rotatable developing member, the first developing position is a position where an electrostatic latent image formed on an image bearing member is developed, and the second developing position is a position where the electrostatic latent image is developed.

12. The developing apparatus according to claim 11, further comprising:

a third rotatable member disposed to face the second rotatable developing member, the third rotatable member being configured to receive the developer delivered from the second rotatable developing member by a magnetic field generated by the second magnet; and a third magnet provided non-rotatably and stationarily inside the third rotatable member, wherein the developing container includes a supply chamber configured to supply the developer to the first rotatable developing member, and a collecting chamber partitioned from the supply chamber by a partition wall and configured to collect the developer after developing the electrostatic latent image, and wherein the third rotatable member is configured to carry and feed the developer to collect the developer after developing the electrostatic latent image into the collecting chamber.

13. The developing apparatus according to claim 1, wherein an absolute value of a maximum value of the magnetic flux density of the third magnetic pole in the normal direction relative to the outer peripheral surface of the second rotatable developing member is 0.5 times or more an absolute value of a maximum value of the magnetic flux density of the first magnetic pole in the normal direction relative to the outer peripheral surface of the first rotatable developing member.

14. The developing apparatus according to claim 1, wherein an absolute value of a maximum value of the magnetic flux density of the third magnetic pole in the normal direction relative to the outer peripheral surface of the second rotatable developing member is 1.5 times or less an absolute value of a maximum value of the magnetic flux density of the first magnetic pole in the normal direction relative to the outer peripheral surface of the first rotatable developing member.

15. A developing apparatus comprising:

a first rotatable developing member to which a developer including a toner and a carrier is supplied, the first rotatable developing member being configured to carry and feed the developer to a first developing position;

a first magnet provided non-rotatably and stationarily inside the first rotatable developing member, the first magnet having a first magnetic pole and a second magnetic pole provided downstream of the first magnetic pole and adjacent to the first magnetic pole in a rotational direction of the first rotatable developing member and having the same magnetic polarity as that of the first magnetic pole;

a second rotatable developing member disposed to face the first rotatable developing member and configured to receive the developer delivered from the first rotatable developing member by a magnetic field generated by the first magnet, the second rotatable developing member being configured to carry and feed the developer to a second developing position, the second rotatable developing member having a rotation axis positioned higher than a rotation axis of the first rotatable developing member in a vertical direction, the rotational direction of the first rotatable developing member at a first closest position where the first rotatable developing member is closest to the second rotatable developing member on an outer surface of the first rotatable developing member being opposite to a rotational direction of the second rotatable developing member at a second closest position where the second rotatable developing member is closest to the first rotatable developing member on an outer surface of the second rotatable developing member; and a second magnet provided non-rotatably and stationarily inside the second rotatable developing member, the second magnet having a third magnetic pole disposed to face the first magnetic pole and having a different magnetic polarity from that of the first magnetic pole, wherein a first maximum position where a magnetic flux density of the first magnetic pole in a normal direction relative to an outer peripheral surface of the first rotatable developing member is maximum is positioned downstream of the first developing position and upstream of the first closest position in the rotational direction of the first rotatable developing member, a second maximum position where a magnetic flux density of the third magnetic pole in a normal direction relative to an outer peripheral surface of the second rotatable developing member is maximum is positioned downstream of the second closest position and upstream of the second developing position in the rotational direction of the second rotatable developing member, an absolute value of a maximum value of the magnetic flux density of the third magnetic pole in the normal direction relative to the outer peripheral surface of the second rotatable developing member is 0.5 times or more an absolute value of a maximum value of the magnetic flux density of the first magnetic pole in the normal direction relative to the outer peripheral surface of the first rotatable developing member, and a relationship of $r1\times\theta1 > r2\times\theta2$ is satisfied, in a case where r1 represents a radius of the first rotatable developing member, r2 represents a radius of the second rotatable developing member,

θ1 represents an angle from the first maximum position to the first closest position in the rotational direction of the first rotatable developing member, and θ2 represents an angle from the second closest position to the second maximum position in the rotational direction of the second rotatable developing member.

16. The developing apparatus according to claim 15, wherein the absolute value of the maximum value of the magnetic flux density of the third magnetic pole in the normal direction relative to the outer peripheral surface of the second rotatable developing member is 0.75 times or more the absolute value of the maximum value of the magnetic flux density of the first magnetic pole in the normal direction relative to the outer peripheral surface of the first rotatable developing member.

17. The developing apparatus according to claim 15, wherein the absolute value of the maximum value of the magnetic flux density of the third magnetic pole in the normal direction relative to the outer peripheral surface of the second rotatable developing member is 1.0 times or more the absolute value of the maximum value of the magnetic flux density of the first magnetic pole in the normal direction relative to the outer peripheral surface of the first rotatable developing member.

18. The developing apparatus according to claim 15, wherein the absolute value of the maximum value of the magnetic flux density of the third magnetic pole in the normal direction relative to the outer peripheral surface of the second rotatable developing member is 1.5 times or less the absolute value of the maximum value of the magnetic flux density of the first magnetic pole in the normal direction relative to the outer peripheral surface of the first rotatable developing member.

19. The developing apparatus according to claim 15, wherein the absolute value of the maximum value of the magnetic flux density of the third magnetic pole in the normal direction relative to the outer peripheral surface of the second rotatable developing member is 1.25 times or less the absolute value of the maximum value of the magnetic flux density of the first magnetic pole in the normal direction relative to the outer peripheral surface of the first rotatable developing member.

* * * * *